(12) United States Patent
Xu et al.

(10) Patent No.: US 12,718,807 B2
(45) Date of Patent: Aug. 25, 2026

(54) ADVANCED TELEPROMPTER WITH DYNAMIC CONTENT MANAGEMENT

(71) Applicant: Adeia Guides Inc., San Jose, CA (US)

(72) Inventors: Ning Xu, Irvine, CA (US); Toshiro Ozawa, Irvine, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 276 days.

(21) Appl. No.: 18/621,270

(22) Filed: Mar. 29, 2024

(65) Prior Publication Data

US 2025/0308516 A1 Oct. 2, 2025

(51) Int. Cl.

| | |
|---|---|
| ***G10L 15/183*** | (2013.01) |
| ***G06F 40/166*** | (2020.01) |
| ***G10L 15/18*** | (2013.01) |
| ***G10L 25/63*** | (2013.01) |

(52) U.S. Cl.

CPC .......... *G10L 15/183* (2013.01); *G06F 40/166* (2020.01); *G10L 15/1815* (2013.01); *G10L 25/63* (2013.01)

(58) Field of Classification Search

CPC ... G10L 15/183; G10L 15/1815; G10L 15/18; G10L 25/63; G10L 25/48; G10L 15/26; G06F 40/166; G06F 40/191; G06F 40/103; G06F 40/253

See application file for complete search history.

(56) References Cited

U.S. PATENT DOCUMENTS

| | | | |
|---|---|---|---|
| 9,953,646 B2 | 4/2018 | Sadkin et al. | |
| 10,546,409 B1 * | 1/2020 | Subramonyam | G06F 3/167 |
| 10,645,460 B2 | 5/2020 | Paul | |
| 2020/0014823 A1 | 1/2020 | Chen | |
| 2020/0034408 A1 | 1/2020 | Gourley et al. | |
| 2021/0279406 A1 | 9/2021 | Jones et al. | |
| 2023/0127120 A1 | 4/2023 | Chandran et al. | |
| 2024/0114106 A1 * | 4/2024 | Chandran | G10L 15/26 |
| 2025/0299668 A1 * | 9/2025 | Canberk | B60R 16/0373 |

* cited by examiner

*Primary Examiner* — Huyen X Vo

(74) *Attorney, Agent, or Firm* — HG LAW LLP

(57) ABSTRACT

Systems and methods are provided herein for an advanced teleprompter with dynamic content management. The script management system (SMS) of this advanced teleprompter receives a transcript with consecutive sections of text for dynamic display at a client device and provides for dynamic display the consecutive sections of text at a first pace. After the SMS receives the transcript, the SMS ingests the prepared transcript and the given time frame for the speech, and then uses the transcript as an input for a large language model (LLM). Once the SMS detects speech from a speaker the SMS inputs the transcript and the text of the speech from the speaker into the LLM and modifies a section subsequent to the first section of text based on the output of the LLM that results from the inputs of the transcript and the text of the speech. The SMS then provides for dynamic display the modified section subsequent to the first section of text of the plurality of consecutive sections of text.

20 Claims, 20 Drawing Sheets

Instead of saying "Let's delve into how it achieves this, starting with data security, the speaker deviated to talk about user experience. The system inserted a corrective sentence to draw the speech back to data security.

The speaker picks up the skipped paragraph, which is then expanded.

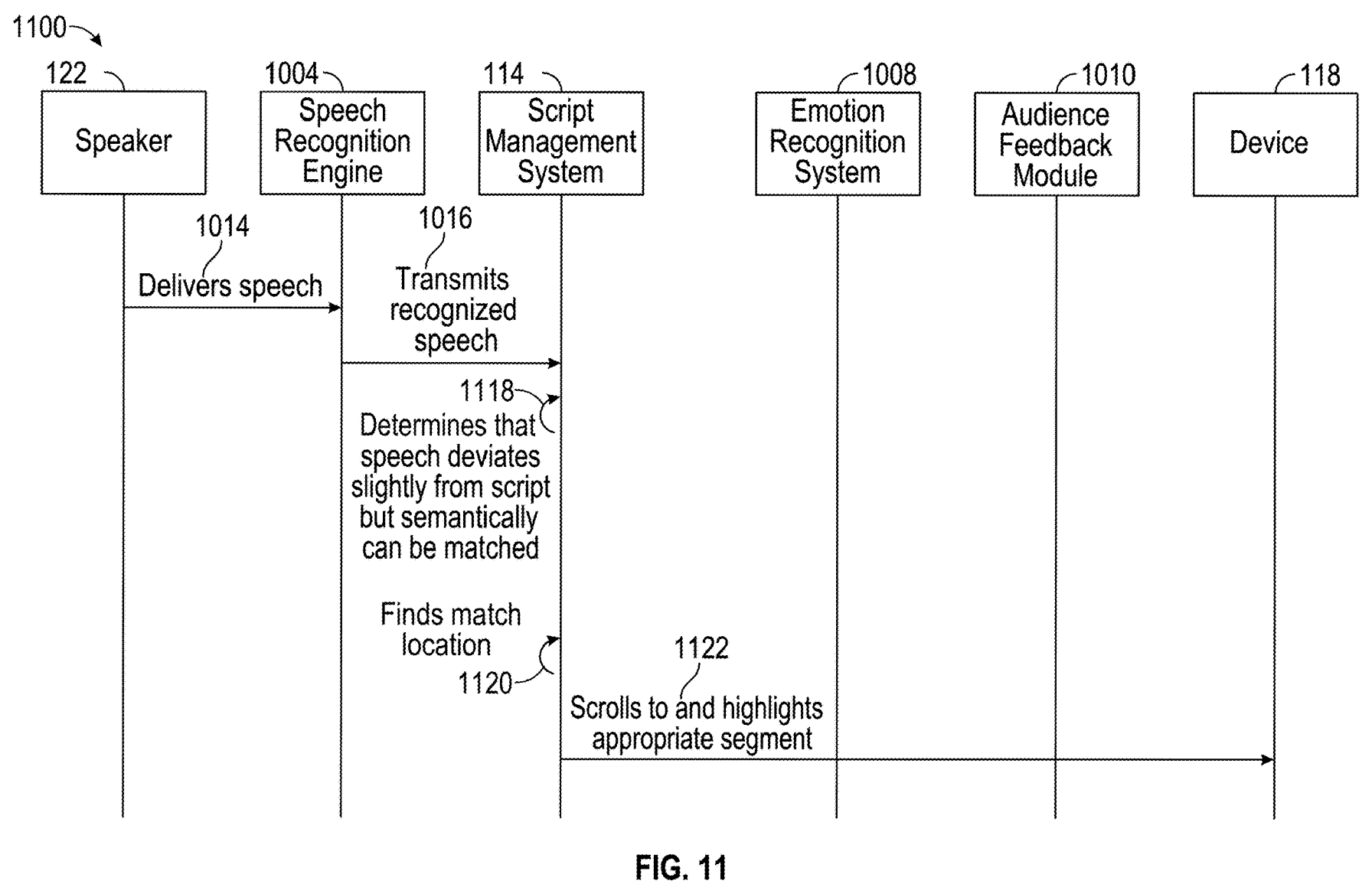

1100

122 Speaker

1004 Speech Recognition Engine

114 Script Management System

1008 Emotion Recognition System

1010 Audience Feedback Module

118 Device

1014 Delivers speech

1016 Transmits recognized speech

1118 Determines that speech deviates slightly from script but semantically can be matched 1120 Finds match location 1122 Scrolls to and highlights appropriate segment

FIG. 11

ADVANCED TELEPROMPTER WITH DYNAMIC CONTENT MANAGEMENT

BACKGROUND

The present disclosure is directed towards techniques for an advanced teleprompter with dynamic content management.

SUMMARY

Traditional teleprompters lack dynamic and responsive features, which limits their effectiveness in various speaking scenarios. Teleprompters often follow a rigid and static transcript, which can lead to challenges when a speaker deviates from the prepared text, experiences a shift in emotional tone or needs to adjust to real-time audience interaction. Typically, teleprompters are agnostic of a speaker's changes to, e.g., words, tone of voice, volume of voice, and physical gestures. These limitations with teleprompters and static transcripts can result in less engaging and less effective presentations, as they discourage speakers are from adapting their delivery spontaneously and deviating from a prepared transcript. Current teleprompters lack awareness and adaptability.

The development of teleprompter technology has traditionally focused on presenting speakers with a transcript display and management during presentations. Existing technologies have largely centered on enhancing the fluidity and synchronization of text display with the speaker's pace. These developments, however, do not address the dynamic and interactive needs of modern presentations. For instance, such approaches lack features for real-time transcript adaptation in response to the speaker's deviation from the transcript or audience feedback.

In some approaches, a method of matching spoken words to text in the transcript is used to provide the correct text string for display. In other approaches, scrolling speed is adjusted based on the speaker's pace. These approaches are deficient, however, because there is no allowance for comprehensive content management or emotional adaptability in response to the speaker's tone or audience reactions. Current approaches typically do not even capture data on the content being read and/or an audience reaction.

To overcome these problems, systems and methods are provided herein for an advanced teleprompter with dynamic content management. The script management system (SMS) of this advanced teleprompter fine-tunes the synchronization between the speaker and the transcript while integrating speech recognition with context-aware and predictive text flow to ensure seamless, anticipatory scrolling of transcripts. The SMS also has deviation correction capabilities with on-the-fly sentence generation for smooth transitions when speakers stray from the transcript, and dynamic content reordering for non-linear speech patterns. Further, emotion recognition adjusts transcript presentation to the speaker's tone, and interactive audience feedback refines the transcript in real time. For instance, the SMS may be thought of as providing a dynamic transcript rather than a static pre-configured transcript, capable of seamless real-time additions, edits and deletions responsive to the speaker, the audience, and/or the content of the transcript itself (e.g., accounting for content that already has been delivered as well as content that is planned to be delivered).

In some embodiments, the SMS is a key software component that implements the functionality of the advanced teleprompter. In some examples, the core of the SMS is a pretrained large language model (LLM). In some embodiments, the SMS receives a transcript with consecutive sections of text for dynamic display at a client device and provides for dynamic display the consecutive sections of text at a predetermined pace. In some embodiments, after the SMS receives the transcript, the SMS ingests the prepared transcript and the given time frame for the speech, and then uses the transcript as an input for the LLM. Once the SMS detects speech from a speaker, while providing the first section of the consecutive sections of text for dynamic display, the SMS inputs the transcript and the text of the speech from the speaker into the LLM and modifies a section subsequent to the first section of text based on the output of the LLM that results from the inputs of the transcript and the text of the speech. The SMS then provides for dynamic display the modified section subsequent to the first section of text of the plurality of consecutive sections of text. In some embodiments, the SMS comprises a model that accepts audio input directly, e.g., without first having to convert audio speech to text.

Such aspects enhance user engagement and presentation quality, representing a significant innovation for industries reliant on effective communication by offering a more flexible, responsive, and interactive teleprompting experience. This improved system signifies a novel direction in teleprompter technology, moving towards a more interactive, adaptable, and intelligent system that caters to the evolving demands of public speaking and presentations.

In some embodiments, the SMS also determines a pace of the speech from the speaker and adjusts the predetermined pace of the scrolling through the plurality of the consecutive sections of text to match the pace of the speech from the speaker. However, the SMS is also designed to respect the time constraints of the presentation. In some embodiments, an LLM recalibrates content on the fly, shortening or expanding sections, to maintain the overall timing of the speech, all while preserving the core messages and objectives set forth by the speaker. In some examples, a time check will be performed at a pre-set interval, and if the estimated finishing time is later than the initial expected finishing time by a certain amount, for example, more than one minute, the rest of the transcript, starting from the next paragraph, will be re-generated so that the speech can be delivered in the appropriate time frame.

Implementation of an advanced transcript scrolling system that not only synchronizes with the speaker's pace but also understands the context of the speech, predicting and adapting to the next likely segment, provides a more intuitive and anticipatory scrolling experience.

In some embodiments, the SMS determines that the speech from the speaker is a semantical match to a section of text of the plurality of consecutive sections of text and provides for dynamic display the section of text that the speech from the speaker semantically matches to, highlighting the section of text that the speech from the speaker is semantical match to. In some embodiments, as the speech is delivered, a speech recognition engine (SRE) of the SMS actively translates spoken words into text. This real-time transcription allows the SMS to track the speaker's adherence to the transcript with a semantic matching process. In some embodiments, the semantic matching process within the SMS leverages the capabilities of an LLM to interpret the speech recognition results. As the SRE transcribes the speaker's words, an LLM analyzes this output in the context of the pre-loaded transcript. In some embodiments, an LLM assesses semantic similarity and relevance, identifying the most closely related transcript segments even when the speaker's language does not precisely match the original text. After the semantic matching, the spoken sentence or partial sentence will be classified as either a match, with the location of the match, or a deviation from the transcript, which means it does not have a match in the pre-loaded transcript.

In some embodiments, the SMS modifies, e.g., using an LLM, the first section of text based on determining a difference between the speech and the first section of text by generating a corrective sentence, using an LLM, corresponding to the difference between the speech and first section of text and generating for presentation the corrective sentence within the first section of text. In some embodiments, when the SRE detects a deviation from the transcript, it triggers different responses based on the nature of the discrepancy. For some minor deviations, the SMS generates corrective sentences designed to bridge the speaker back to the intended transcript path without drawing attention to the discrepancy. In some embodiments, the SMS generates corrective sentences using an LLM with a pre-designed prompt, giving the deviated sentence, the pre-loaded transcript, and the deviated location as inputs. For example, the prompt could be "Please write a sentence to bridge the deviated sentence back to the next sentence in this pre-loaded transcript."

Such aspects offer a more flexible teleprompting experience by generating prompt sentences on the fly to guide speech back on track when deviations from the transcript are detected.

In some embodiments, the SMS determines, using the LLM, that the speech matches a section of text of the plurality of consecutive sections of text that is not the first section of text, reorders the plurality of consecutive sections of text based on determining that the speech matches the section of text of the plurality of sections of text that is not the first section of text, generates an indicator for display at the client device that the first section of text has been collapsed, and provides for dynamic display the section of text of the plurality of consecutive sections of text that matches the speech. In some embodiments, when the speaker skips ahead or rearranges points, the content reordering module (CRM) within the SMS is activated. In some examples, the CRM seamlessly collapses the skipped points into brief summaries while displaying the summaries on the client device together with the matched sentence. The SMS will keep monitoring whether the speaker goes back to the skipped paragraph and generates the transcript for display accordingly by collapsing, reordering, expanding, and deleting skipped points.

Such aspects enable adjustment of the order of transcript sections in real time based on spontaneous changes in the speech flow.

In some embodiments, the SMS detects emotional cues from the speaker. For instance, the SMS may detect emotional cues from the tone of the speaker's voice, the speaker's expressions, and/or the speaker's gestures. In some embodiments, the SMS modifies, using the LLM, the first section of text based on the detected emotional cues from the speaker. In some embodiments, the LLM also assesses the transcript to determine the emotional tone appropriate for each segment and to forecast possible audience reactions.

In some examples, the LLM assesses the transcript using specific prompts, e.g., "What is the tone of each paragraph of the transcript?", "What is the expected audience reaction?" In some embodiments, as the speaker progresses, the SMS continuously evaluates the actual delivery against these predictions.

In some embodiments, the SMS detects emotional cues from audience members. If a discrepancy arises, for example, a misalignment between the speaker's tone and the emotional context of the speech, or an unanticipated audience reaction, the LLM dynamically generates alternative transcript segments. The generated transcript segments are designed to steer the presentation back into alignment with an emotional trajectory, e.g., bringing the presentation away from having a tone that mismatches the audience's emotions, and towards a tone that matches the audience's emotions, that more closely matches the speech context and to resonate more deeply with the audience. This real-time transcript adjustment is subtle, ensuring that the speaker can seamlessly integrate the new text without disruption. In some examples, the dynamic generation of new, alternative transcript segments can also be implemented using a pre-designed prompt, with part of the prompt being variables that can be changed based on the emotion recognition system and the audience feedback module, for example, "Please write the rest of the transcript with this new [TONE]", where the [TONE] is an output of the emotion recognition system. In some embodiments, the SMS then displays to the speaker the recommended modifications to the first section of text based on the detected emotional cues from the audience members, receives a selection from the speaker accepting the recommended modifications, and modifies, using an LLM, the first section of text based on the recommended modifications. In some embodiments, the SMS displays some instructions for emotion, expressions, and/or gestures on the teleprompter for the speaker in, for example, a format of text or icons different from the format of the text to be presented.

Such aspects integrate emotion recognition technology to dynamically modify the transcript presentation, aligning with the speaker's emotional tone and enhancing audience engagement and relevance.

BRIEF DESCRIPTION OF THE DRAWINGS

The present disclosure, in accordance with one or more various embodiments, is described with reference to the following figures. The drawings are provided for purposes of illustration only and merely depict typical or example embodiments. These drawings are provided to facilitate an understanding of the concepts disclosed herein and do not limit the breadth, scope, or applicability of these concepts. It should be noted that for clarity and ease of illustration these drawings are not necessarily made to scale.

FIG. 11 is a sequence diagram of a system for dynamic content management on an advanced teleprompter based on determining that detected speech from a user deviates slightly from predicted text in a transcript but can be semantically matched, in accordance with some embodiments of the present disclosure;

DETAILED DESCRIPTION OF EMBODIMENTS OF THE DISCLOSURE

Figure 1:
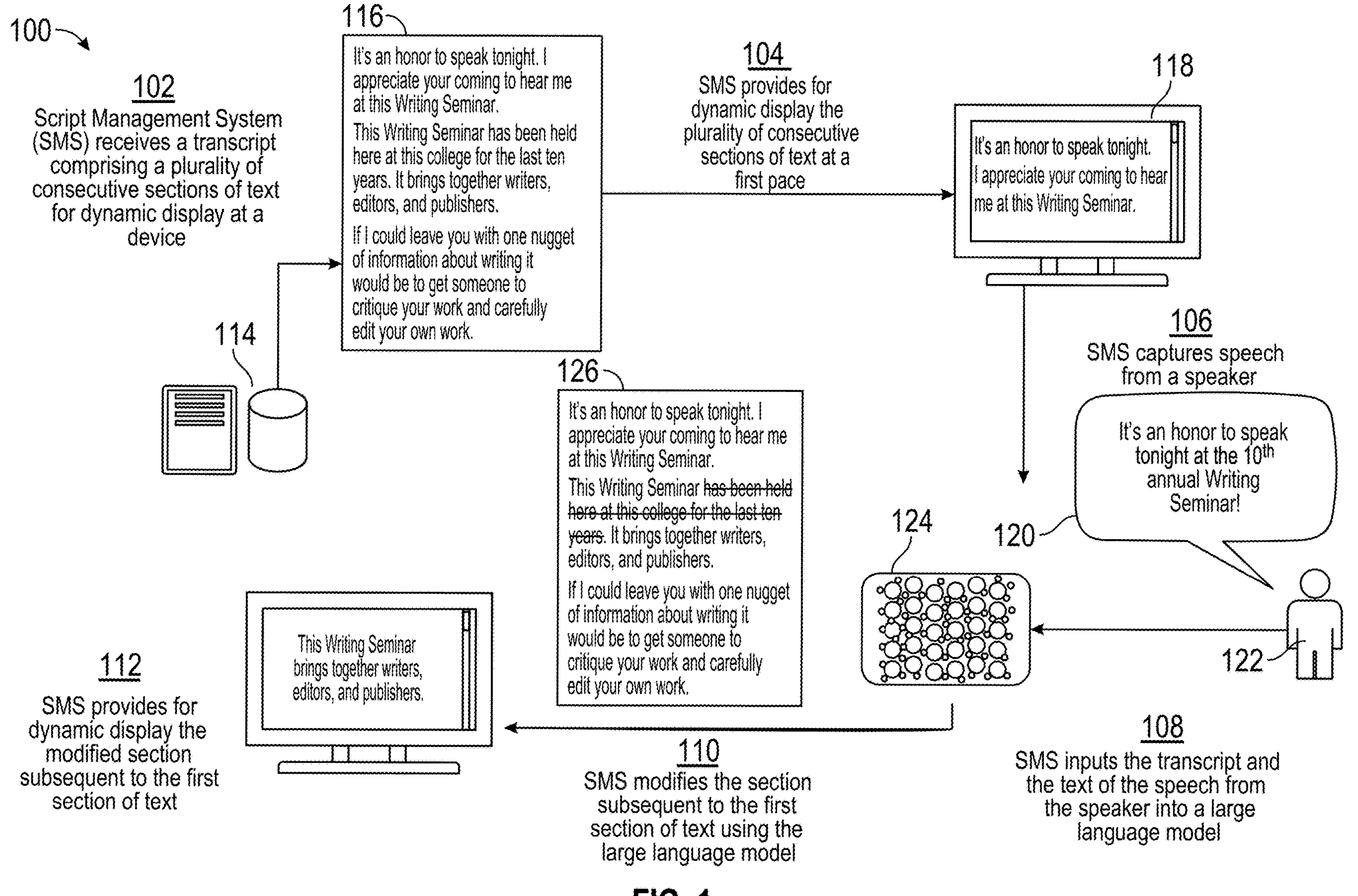
FIG. 1 is an illustrative example of a system for an advanced teleprompter with dynamic content management, in accordance with some embodiments of the present disclosure.

FIG. 1 is an illustrative example of a system 100 for an advanced teleprompter with dynamic content management, in accordance with some embodiments of the present disclosure. In some embodiments, system 100 includes script management system (SMS) 114, transcript 116, device 118, and large language model (LLM) 124. System 100 may include additional servers, devices, and/or networks. For example, functionality of SMS 114 may be shared between several servers, providing a cloud computing solution. In some examples, the steps outlined within system 100 are performed by SMS 114. In one implementation, SMS 114 is a key software component that implements the functionality of the advanced teleprompter. In some examples, the core of the SMS is LLM 124. In some embodiments, SMS 114 is implemented on a delivery server that delivers transcripts to speeches over a network (e.g., the internet, a cellular network, or any suitable network) to user computing devices (e.g., smartphones, computers, laptops, etc.) for consumption, e.g., presentation, local storage, downloading, or other media consumption operations. Device 118 may be a personal computing device running a teleprompter software application, a monitor or other display device, an in-camera teleprompter, or any one of devices 1802, 1806, 1808, and 1814, as described further below with reference to FIG. 18. The actions and descriptions of FIG. 1 may be used with any other embodiment of this disclosure. In addition, the actions and descriptions described in FIG. 1 may be done in suitable alternative orders or in parallel to further the purposes of this disclosure.

In some embodiments, at step 102, SMS 114 receives transcript 116 comprising a plurality of consecutive sections of text for dynamic display at device 118. In some examples, the first section of text in transcript 116 is "It's an honor to speak tonight. I appreciate your coming to hear me at this writing seminar"; the second section of text in transcript 116 is "This Writing Seminar has been held here at this college for the last 10 years. It brings together writers, editors, and publishers"; and the third section of text in transcript 116 is "If I could leave you with one nugget of information about writing it would be to get someone to critique your work and carefully edit your own work." In some embodiments, at step 104, SMS 114 provides for dynamic display the plurality of consecutive sections of text at a first pace on device 118. For example, the device 118 displays only the first section of the plurality of consecutive sections of text of transcript 116, "It's an honor to speak tonight. I appreciate your coming to hear me at this Writing Seminar," for 10 seconds before beginning to display the second section of the plurality of consecutive sections of text of transcript 116. In some embodiments, the dynamic display may be a scrolling display, with the consecutive sections of text being slowly revealed sentence by sentence as if a user is scrolling down on a display, to smoothly provide words to the speaker 122 in a way that mimics the flow of natural speech.

In some implementations, at step 106, SMS 114 captures speech 120 from a speaker 122. For example, the speech could be "It's an honor to speak tonight at the $10^{th}$ annual Writing Seminar!" In some embodiments, SMS 114 determines the pace of the captured speech 120 from the speaker and adjusts the first pace of the dynamic display of the plurality of consecutive sections of text to match the pace of the speech from the speaker. For example, assuming that each section of text has roughly the same number of words, if the first pace is 10 seconds per section of text and the user finishes the first section of text in five seconds, SMS 114 adjusts the pace to be five seconds of display time for the next section of text. In another example, if the first pace is 10 seconds per section of text and the user doesn't finish the first section of text in 10 seconds, SMS 114 adjust the pace to be 15 seconds of display time for the next section of text. In some embodiments, SMS 114 processes speech 120 from speaker 122 using a voice-to text model to convert the speech 120 to text.

In some embodiments, at step 108, SMS 114 inputs the transcript 116 and the text of the speech 120 from the speaker 122 into LLM 124. In some embodiments, SMS 114 uses automatic speech recognition (ASR) and natural language processing (NLP) to process the text of the speech 120. In some implementations, at step 110, SMS 114 modifies, using LLM 124, one of the sections subsequent to the first section of text of the plurality of sections of text of transcript 116 based on the output of LLM 124 that results from the inputs of transcript 116 and the text of the speech 120. For example, based on the text of the speech 120 saying "It's an honor to speak tonight at the 10th annual Writing Seminar," the second section of text of the plurality of sections of text of transcript 116 is modified to delete "has been held here at this college for the last 10 years," as the speaker 122 has already mentioned that this is the 10th annual seminar. In some embodiments, at step 112, SMS 114 provides for dynamic display the modified section subsequent to the first section of text, for example, "This Writing Seminar brings together writers, editors, and publishers."

Figure 2:
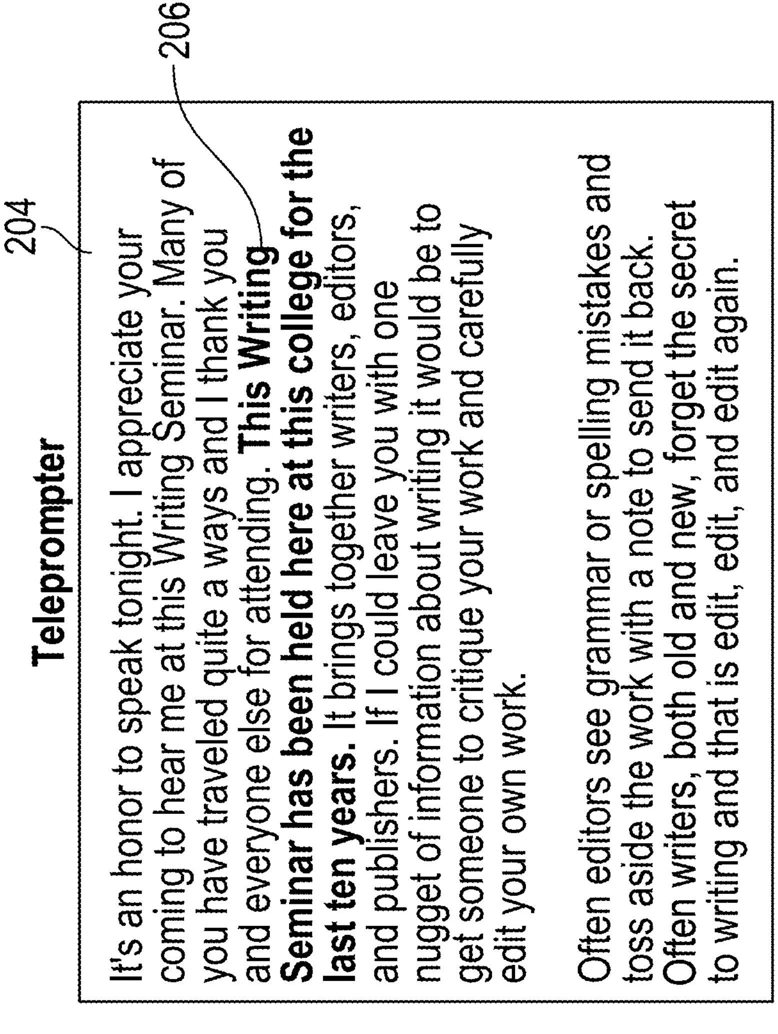
FIG. 2 is an illustrative example of a system for semantical match detection for a teleprompter with dynamic content management, in accordance with some embodiments of the present disclosure.

FIG. 2 is an illustrative example of a system for semantical match detection for a teleprompter with dynamic content management, in accordance with some embodiments of the present disclosure. System 200 includes SMS 114, device 118, LLM 124, and transcript 204. In some embodiments, while SMS 114 is providing a plurality of sections of text from transcript 204 for display on device 118, SMS 114 captures speech 202 from a speaker 122 and processes the speech 202 and transcript 204 using LLM 124, as described further above with reference to FIG. 1. In some embodiments, SMS 114 determines, using LLM 124, that speech 202 is a semantical match to section of text 206 of the plurality of consecutive sections of text of transcript 204. For example, SMS 114 determines that speech 202, "For the last 10 years, we have held this seminar at this college . . . ," is a semantical match to section of text 206, "This Writing Seminar has been held here at this college for the last 10 years." In some embodiments, SMS 114 then provides for dynamic display on device 118 section of text 206, and then highlights section of text 206 on device 118.

Figure 3:
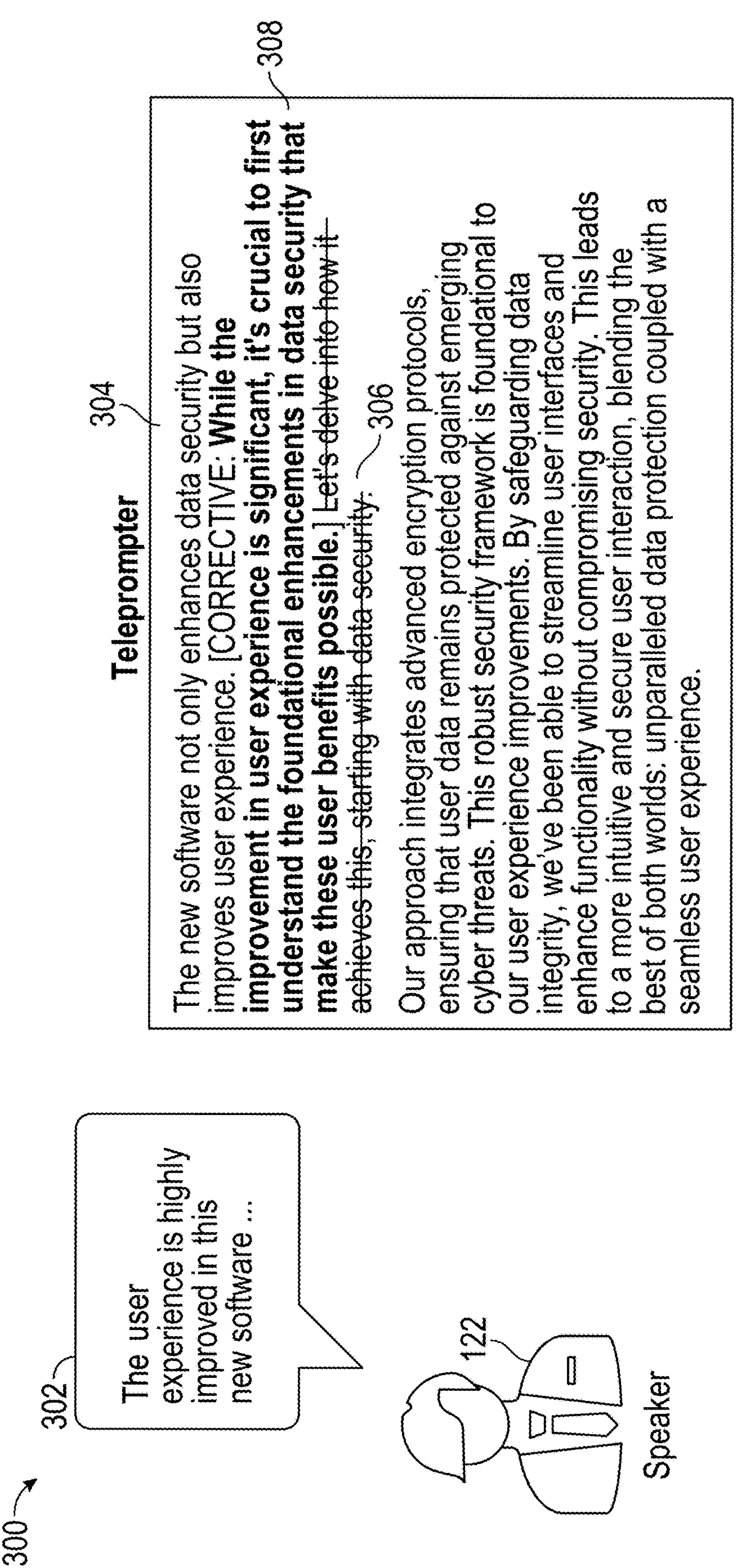
FIG. 3 is an illustrative example of a system for deviation correction and dynamic script modification for an advanced teleprompter with dynamic content management, in accordance with some embodiments of the present disclosure.

FIG. 3 is an illustrative example of a system for deviation correction and dynamic script modification for an advanced teleprompter with dynamic content management, in accordance with some embodiments of the present disclosure. System 300 includes SMS 114, device 118, LLM 124, and transcript 304. In some embodiments, while SMS 114 is providing a plurality of sections of text from transcript 304 for display on device 118, SMS 114 captures speech 302 from a speaker 122 and processes the speech 302 and transcript 304 using LLM 124, as described further above with reference to FIG. 1. In some embodiments, SMS 114 determines, using LLM 124, that the speech 302 deviates from the first section of text 306 of the plurality of consecutive sections of text from transcript 304. For example, SMS 114 determines, using LLM 124, that speech 302, "The user experience is highly improved in this new software . . . ," is different from the first section of text 306, "Let's delve into how it achieves this, starting with data security." In some embodiments, SMS 114 generates, using LLM 124, corrective sentence 308 and inserts corrective sentence 308 into transcript 304. For example, because speaker 122 deviated to talk about user experience instead of data security, SMS 114 generates corrective sentence 308, "While the improvement in user experience is significant, it's crucial to first understand the foundational enhancements in data security that make these user benefits possible," to draw the speech back to the topic of data security.

Figure 4:
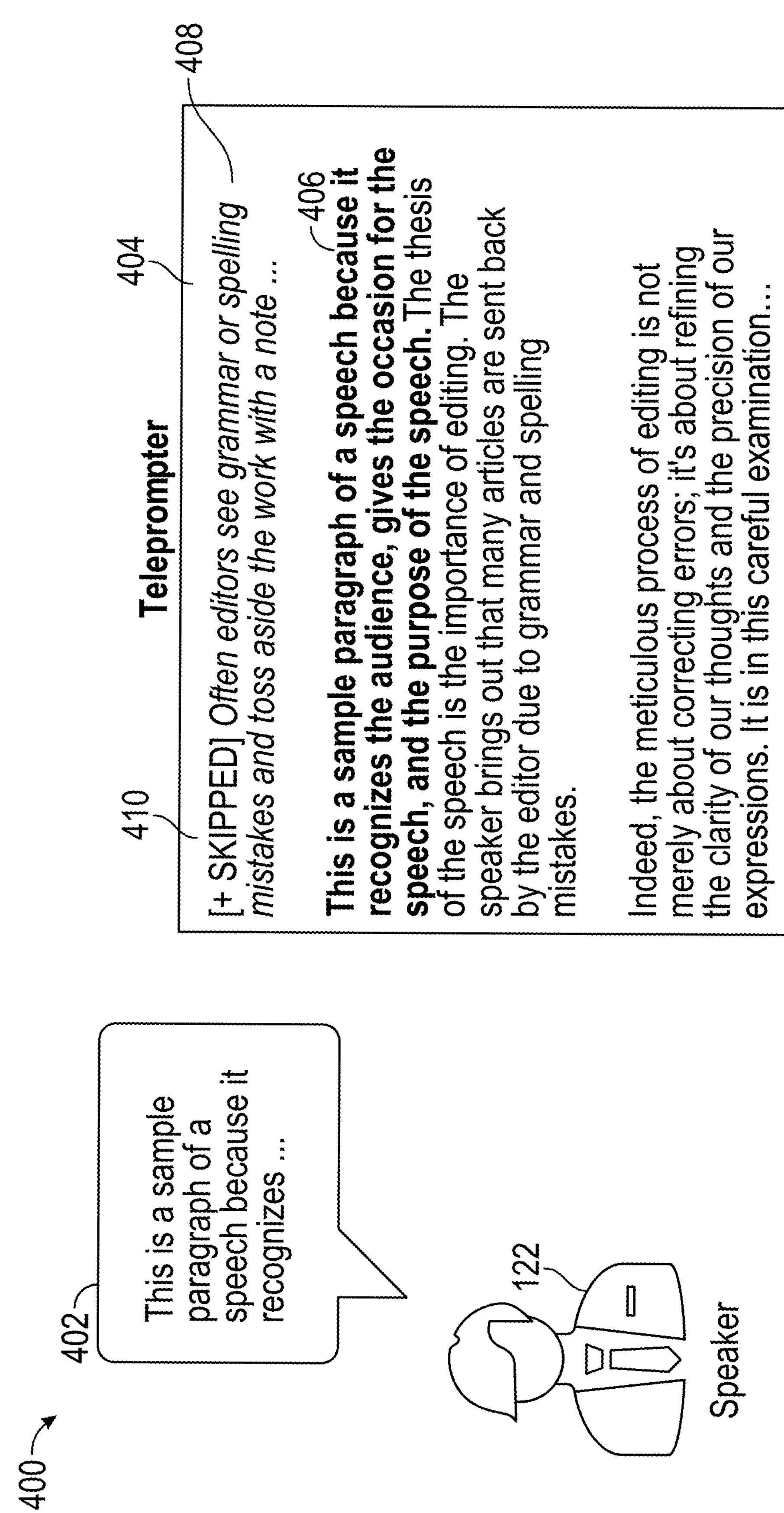
FIG. 4 is an illustrative example of a system for collapsing skipped transcript paragraphs on-screen for an advanced teleprompter with dynamic content management, in accordance with some embodiments of the present disclosure.

FIG. 4 is an illustrative example of a system for collapsing skipped transcript paragraphs on-screen for an advanced teleprompter with dynamic content management, in accordance with some embodiments of the present disclosure. System 400 includes SMS 114, device 118, LLM 124, and transcript 404. In some embodiments, while SMS 114 is providing a plurality of sections of text from transcript 404 for display on device 118, SMS 114 captures speech 402 from a speaker 122 and processes the speech 402 and transcript 404 using LLM 124, as described further above with reference to FIG. 1. In some embodiments, SMS 114 determines, using LLM 124, that section of text 408 of the plurality of sections of text from transcript 404 has been skipped by speaker 122. For example, SMS 114 determines, using LLM 124, that speech 402, "This is a sample paragraph of a speech because it recognizes . . . ," is a match to section of text 406, "This is a sample paragraph of a speech because it recognizes . . . ," but speaker 122 has not yet said anything that matches the beginning of section of text 408, "Often editors see grammar or spelling mistakes and toss aside the work with a note." In some embodiments, SMS 114 collapses section of text 408 so that only the first few words of section of text 408 are visible on device 118 and generates for display indicator 410 to indicate that section of text 408 has been collapsed. For example, indicator 410 is a plus sign and the word "SKIPPED" in all capital letters, between two brackets.

Figure 5:
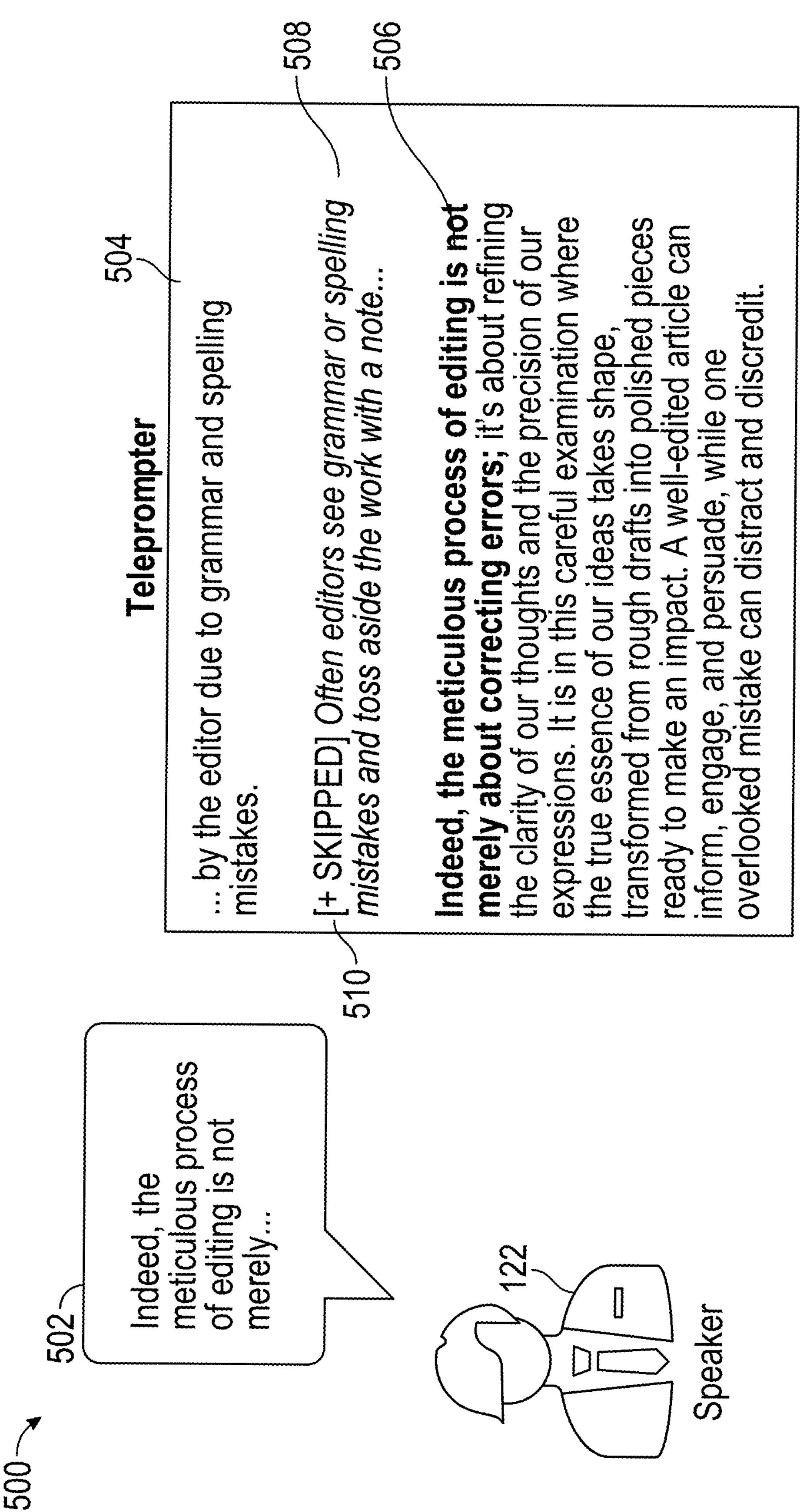
FIG. 5 is an illustrative example of a system for reordering skipped transcript paragraphs on-screen for an advanced teleprompter with dynamic content management, in accordance with some embodiments of the present disclosure.

FIG. 5 is an illustrative example of a system for reordering skipped transcript paragraphs on-screen for an advanced teleprompter with dynamic content management, in accordance with some embodiments of the present disclosure. System 400 includes SMS 114, device 118, LLM 124, and transcript 504. In some embodiments, while SMS 114 is providing a plurality of sections of text from transcript 504 for display on device 118, SMS 114 captures speech 502 from a speaker 122 and processes the speech 502 and transcript 504 using LLM 124, as described further above with reference to FIG. 1. In some embodiments, SMS 114 determines, using LLM 124, that section of text 508 of the plurality of sections of text from transcript 504 has been skipped by speaker 122. For example, SMS 114 determines, using LLM 124, that speech 502, "Indeed, the meticulous process of editing is not merely . . . ," is a match to section of text 506, "Indeed, the meticulous process of editing is not merely about correcting errors," but speaker 122 has not yet said anything that matches the beginning of section of text 508, "Often editors see grammar or spelling mistakes and toss aside the work with a note." In some implementations, SMS 114 reorders the consecutive sections of text of transcript 504 based on determining that speech 502 matches section of text 506, which is not the section of text that was next up in the order of transcript 504, collapses section of text 508 so that only the first few words of section of text 508 are visible on device 118 and generates for display indicator 510 to indicate that section of text 508 has been collapsed. In some examples, SMS 114 then generates for dynamic display section of text 506 of transcript 504 on device 118.

Figure 6:
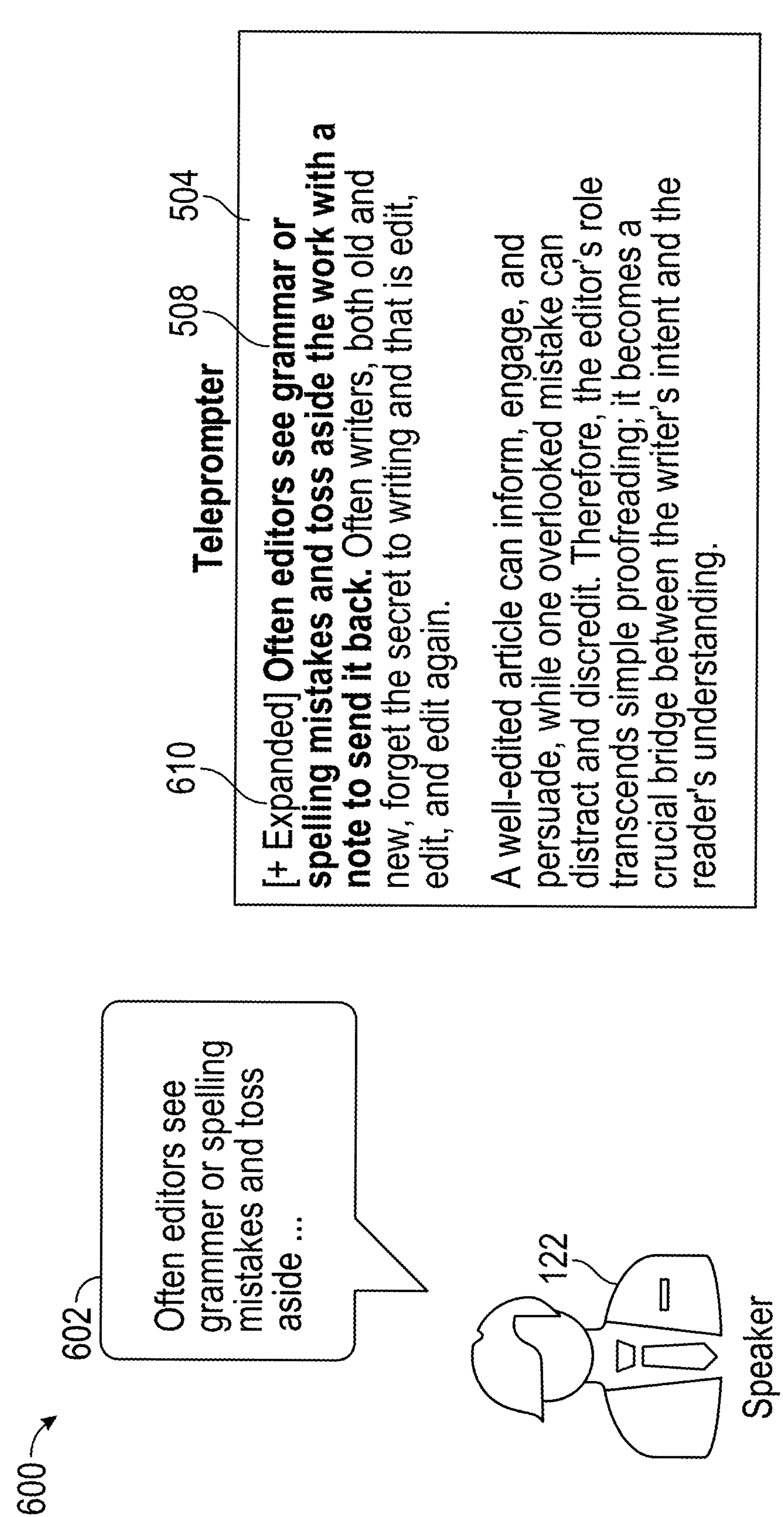
FIG. 6 is an illustrative example of a system for expanding picked-up transcript paragraphs that were previously skipped on-screen for an advanced teleprompter with dynamic content management, in accordance with some embodiments of the present disclosure.

FIG. 6 is an illustrative example of a system for expanding picked-up transcript paragraphs that were previously skipped on-screen for an advanced teleprompter with dynamic content management, in accordance with some embodiments of the present disclosure. System 600 includes SMS 114, device 118, LLM 124, and transcript 504. In some embodiments, while SMS 114 is providing a plurality of sections of text from transcript 504 for display on device 118, SMS 114 captures speech 602 from a speaker 122 and processes the speech 602 and transcript 504 using LLM 124, as described further above with reference to FIG. 1. In some embodiments, SMS 114 determines, using LLM 124, that speech 602 matches the previously skipped section of text 508, as described further above with reference to FIG. 5. For example, speech 602, "Often editors see grammar or spelling mistakes and toss aside . . . ," matches the beginning words of skipped section of text 508, "Often editors see grammar or spelling mistakes and toss aside the work with a note." In some implementations, SMS 114 then removes indicator 510 of FIG. 5 that section of text 508 has been collapsed and generates for display indicator 610 to indicate that section of text 508 has been expanded. For example, indicator 610 is a plus sign and the word "expanded" between two brackets. In some examples, SMS 114 then generates for dynamic display section of text 508 of transcript 504 on device 118.

Figure 7:
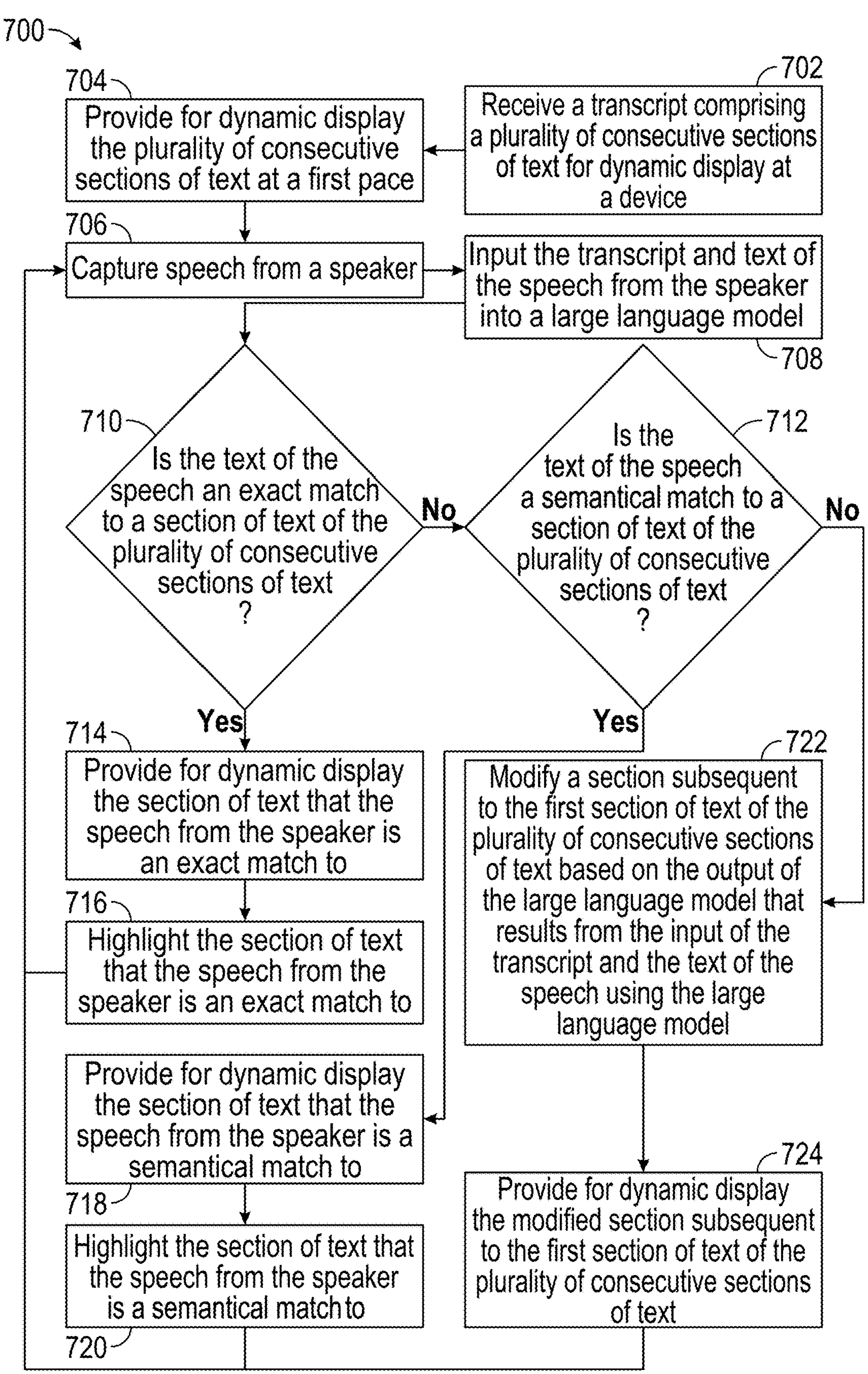
FIG. 7 is a flowchart of an illustrative process for dynamic content management on an advanced teleprompter, in accordance with some embodiments of the present disclosure.

FIG. 7 is a flowchart of an illustrative process for dynamic content management on an advanced teleprompter, in accordance with some embodiments of the present disclosure. In various embodiments, the individual steps of process 700 may be implemented by SMS 114 of FIG. 1. For example, non-transitory memories of one or more components of the SMS and devices of FIGS. 8-9, e.g., storage 914 and control circuitry 911, may store instructions that, when executed by the SMS and devices of FIGS. 8 and 9 (as described further below with reference to FIGS. 8 and 9), cause execution of the process depicted in FIG. 7. The actions and descriptions of FIG. 7 may be used with any other embodiment of this disclosure. In addition, the actions and descriptions described in FIG. 7 may be done in suitable alternative orders or in parallel to further the purposes of this disclosure.

Figure 9:
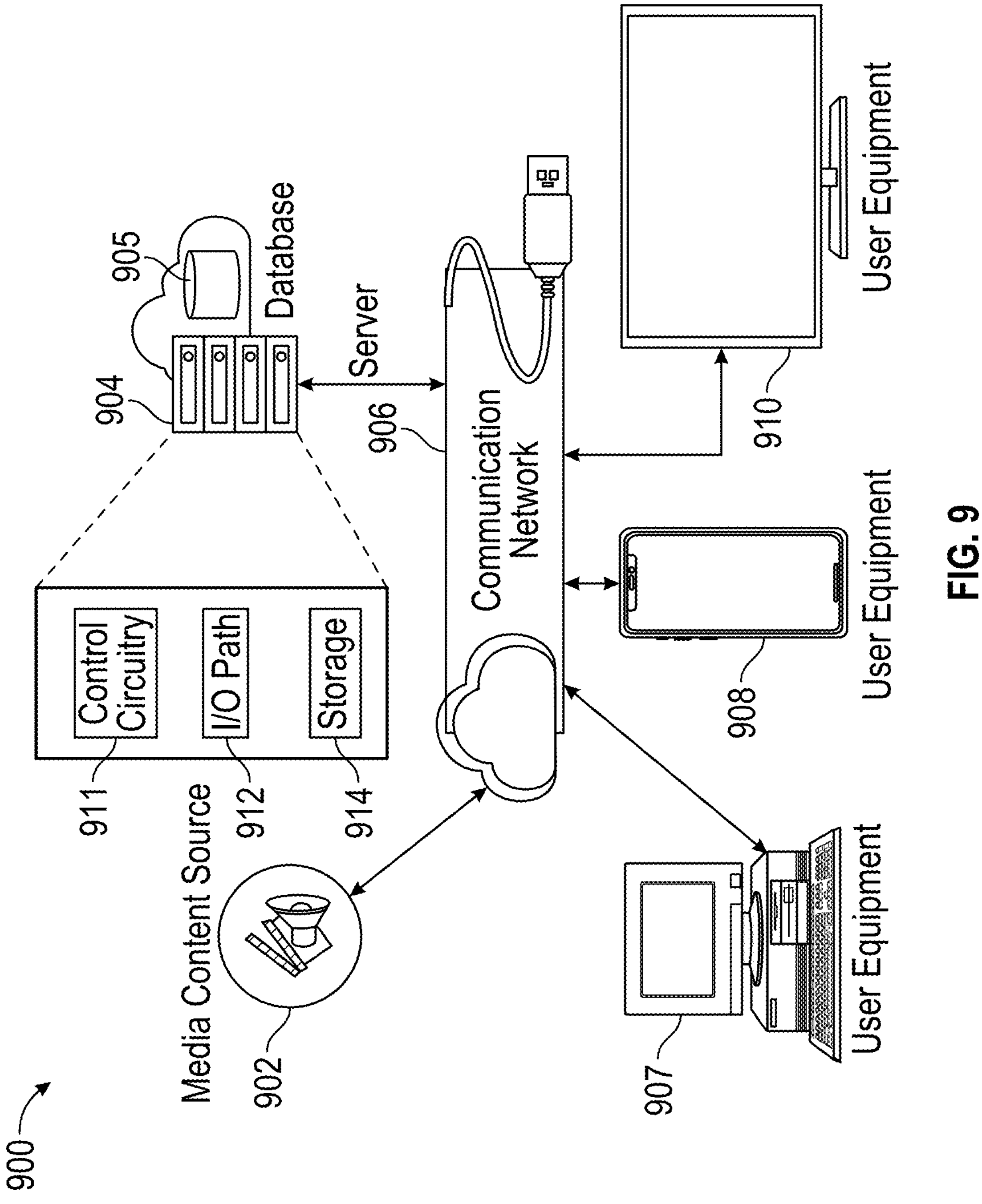
FIG. 9 is a diagram of an illustrative streaming system, in accordance with some embodiments of this disclosure.

In some embodiments, at 702, control circuitry, for example, control circuitry 911 of FIG. 9, receives a transcript, for example, transcript 116 of FIG. 1, comprising a plurality of consecutive sections of text for dynamic display at a device. At 704, control circuitry provides for dynamic display the plurality of consecutive sections of text at a first pace on a device, for example, device 118 of FIG. 1. At 706, control circuitry captures speech from a speaker, for example, speech 120 from speaker 122 of FIG. 1. At 708, control circuitry inputs the transcript and text of the speech from the speaker into an LLM, for example, LLM 124 of FIG. 1. At 710, the control circuitry determines whether the text of the speech is an exact match to a section of text of the plurality of consecutive sections of text. If the control circuitry determines at 710 that the text of the speech is an exact match, process 700 proceeds to 714. If the control circuitry determines at 710 that the text of the speech is not an exact match, process 700 proceeds to 712. At 714, the control circuitry provides for dynamic display the section of text that the speech from the speaker is an exact match to. At 716, the control circuitry highlights the section of text that the speech from the speaker is an exact match to. In some embodiments, process 700 then returns to 706, where the control circuitry resumes capturing speech from a speaker.

At 712, the control circuitry determines whether the text of the speech is a semantical match to a section of text of the plurality of consecutive sections of text. If the control circuitry determines at 712 that the text of the speech is a semantical match, process 712 proceeds to 718. If the control circuitry determines at 712 that the text of the speech is not a semantical match, process 700 proceeds to 722. The determination of whether the text of the speech is or is not a semantical match is described further above with reference to FIG. 2.

At 718, the control circuitry provides for dynamic display the section of text that the speech from the speaker is a semantical match to. At 716, the control circuitry highlights the section of text that the speech from the speaker is a semantical match to. In some embodiments, process 700 then returns to 706, where the control circuitry resumes capturing speech from a speaker.

At 722, the control circuitry modifies a section subsequent to the first section of text of the plurality of consecutive sections of text based on the output of the LLM that results from the input of the transcript and the text of the speech using the LLM. In some embodiments, the control circuitry modifies a section subsequent to the first section of text by generating, using the LLM, a corrective sentence corresponding to the difference between the speech and the first section of text, as described further above with reference to FIG. 3. In some embodiments, the control circuitry modifies a section subsequent to the first section of text by reordering the plurality of consecutive sections of text based on determining that the speech matches the section of text of the plurality of sections of text that is not the first section of text, as described further above with reference to FIGS. 4, 5, and 6. At 724, the control circuitry provides for dynamic display the modified section subsequent to the first section of text of the plurality of consecutive sections of text. In some embodiments, process 700 then returns to 706, where the control circuitry resumes capturing speech from a speaker.

Figure 8:
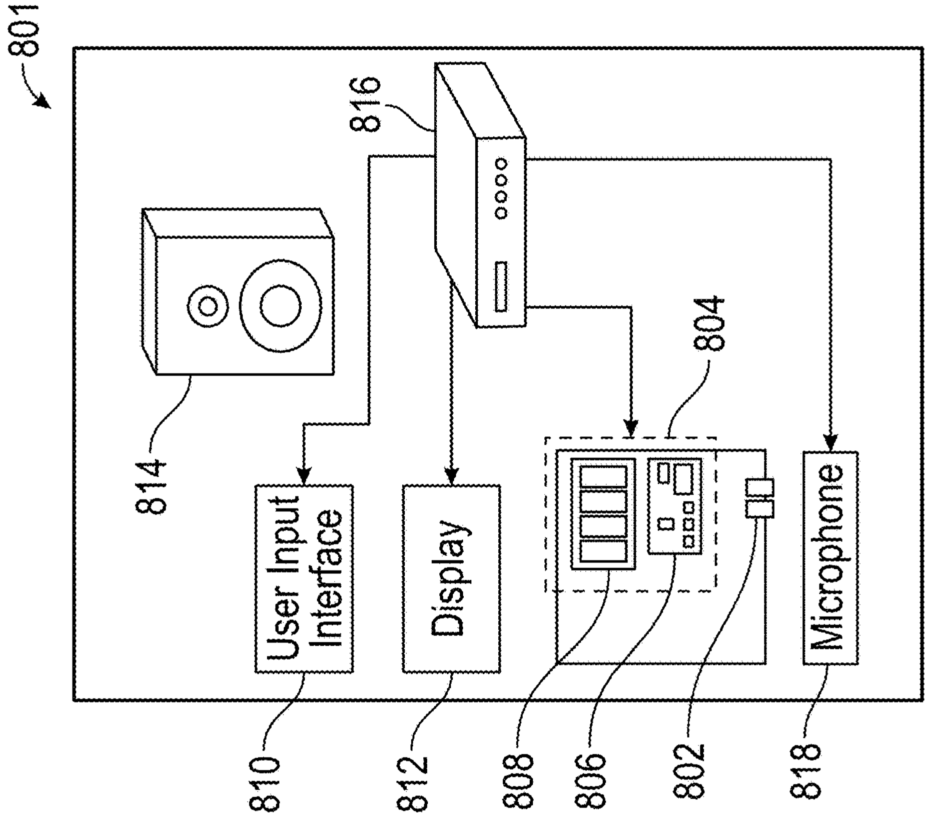
FIG. 8 is a diagram of an illustrative media device, in accordance with some embodiments of this disclosure.
Figure 8:
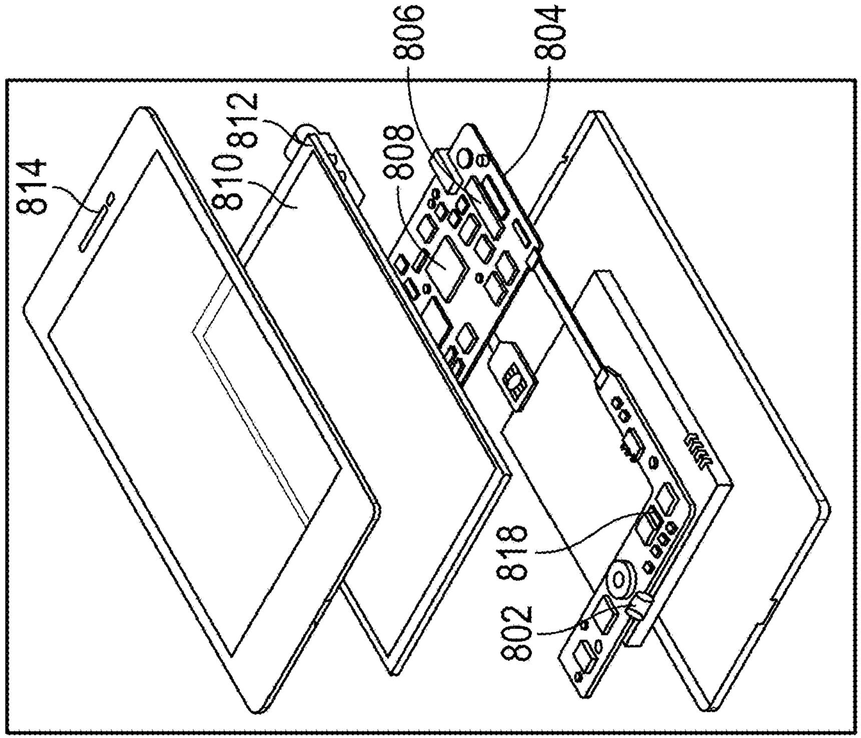

FIGS. 8-9 describe exemplary devices, systems, servers, and related hardware for an advanced teleprompter with dynamic content management, in accordance with some embodiments of the present disclosure. FIG. 8 shows generalized embodiments of illustrative devices 800 and 801. For example, devices 800 and 801 may be smartphone devices, laptops, televisions (e.g., user device 118 of FIG. 1), smart televisions, streaming sticks, smart speakers, or voice assistants. Device 801 may include set-top box 816. Set-top box 816 may be communicatively connected to microphone 818, speaker 814, and display 812. In some embodiments, microphone 818 may receive voice commands. In some embodiments, display 812 may be a television display or a computer display. In some embodiments, set-top box 816 may be communicatively connected to user input interface 810. In some embodiments, user input interface 810 may be a remote-control device. Set-top box 816 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of devices are discussed below in connection with FIG. 8. Each one of devices 800 and 801 may receive content and data via input/output ("I/O") path 802. I/O path 802 may provide content (e.g., broadcast programming, on-demand programming, internet content, content available over a local area network (LAN) or wide area network (WAN), and/or other content) and data to control circuitry 804, which includes processing circuitry 806 and storage 608. Control circuitry 804 may be used to send and receive commands, requests, and other suitable data using I/O path 802, which may comprise I/O circuitry. I/O path 802 may connect control circuitry 804 (and specifically processing circuitry 606) to one or more communications paths (described below). I/O functions may be provided by one or more of these communications paths but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media application stored in memory (i.e., storage 808). Specifically, control circuitry 804 may be instructed by the media application to perform the functions discussed above and below. In some implementations, any action performed by control circuitry 804 may be based on instructions received from the media application.

In client/server-based embodiments, control circuitry 804 may include communications circuitry suitable for communicating with a media application server or other networks or servers. The instructions for carrying out the above-mentioned functionality may be stored on a server (which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 8). In addition, communications circuitry may include circuitry that enables peer-to-peer communication of devices, or communication of devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-4 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of device 800. Circuitry 804 may also include digital-to-analog converter circuitry and analog-to-digital converter circuitry for converting between digital and analog signals. The tuning and encoding circuitry may be used by device 800, 801 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from device 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of device 800 and device 601. For example, display 812 may be a touchscreen or touch-sensitive display. In such circumstances, user input interface 810 may be integrated with or combined with display 812. Display 812 may be one or more of a monitor, a television, a display for a mobile device, or any other type of display. A video card or graphics card may generate the output to display 812. The video card may be any processing circuitry described above in relation to control circuitry 804. The video card may be integrated with the control circuitry 804. Speakers 814 may be provided as integrated with other elements of each one of device 800 and device 801 or may be stand-alone units. The audio component of videos and other content displayed on display 812 may be played through the speakers 814. In some embodiments, the audio may be distributed to a receiver (not shown), which processes and outputs the audio via speakers 814.

The media application may be implemented using any suitable architecture. For example, it may be a stand-alone application wholly implemented on each one of device 800 and device 801. In such an approach, instructions of the application are stored locally (e.g., in storage 808), and data for use by the application is downloaded on a periodic basis (e.g., from an out-of-band feed, from an internet resource, or using another suitable approach). Control circuitry 804 may retrieve instructions of the application from storage 808 and process the instructions to rearrange the segments as discussed. Based on the processed instructions, control circuitry 804 may determine what action to perform when input is received from user input interface 810. For example, movement of a cursor on a display up/down may be indicated by the processed instructions when user input interface 810 indicates that an up/down button was selected.

In some embodiments, the media application is a client/server-based application. Data for use by a thick or thin client implemented on each one of device 800 and device 801 is retrieved on-demand by issuing requests to a server remote to each one of device 800 and device 801. In one example of a client/server-based guidance application, control circuitry 804 runs a web browser that interprets web pages provided by a remote server. For example, the remote server may store the instructions for the application in a storage device. The remote server may process the stored instructions using circuitry (e.g., control circuitry 804) to perform the operations discussed in connection with FIGS. 1-7 and 10-17.

In some embodiments, the media application may be downloaded and interpreted or otherwise run by an interpreter or virtual machine (run by control circuitry 804). In some embodiments, the media application may be encoded in the ETV Binary Interchange Format (EBIF), received by the control circuitry 804 as part of a suitable feed, and interpreted by a user agent running on control circuitry 804. For example, the media application may be an EBIF application. In some embodiments, the media application may be defined by a series of JAVA-based files that are received and run by a local virtual machine or other suitable middleware executed by control circuitry 804. In some of such embodiments (e.g., those employing MPEG-2 or other digital media encoding schemes), the media application may be, for example, encoded and transmitted in an MPEG-2 object carousel with the MPEG audio and video packets of a program.

FIG. 9 is a diagram of an illustrative streaming system, in accordance with some embodiments of the disclosure. Devices 907, 908, 910 (e.g., any one of N user devices 118 of FIG. 1, which may be a smartphone device, laptop, television, smart television streaming stick, smart speaker or voice assistant) may be coupled to communication network 906. Communication network 906 may be one or more networks including the internet, a mobile phone network, mobile voice or data network (e.g., a 4G or LTE network), cable network, public switched telephone network, or other types of communication network or combinations of communication networks. In some embodiments, communication network 906 is the network of FIG. 1 that the server 114 receives user expressions over. Paths (e.g., depicted as arrows connecting the respective devices to the communication network 906) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices may also communicate with each other directly through an indirect path via communication network 906.

System 900 includes a media content source 902 and a server 904, which may comprise or be associated with database 905. Communications with media content source 902 and server 904 may be exchanged over one or more communications paths but are shown as a single path in FIG. 9 to avoid overcomplicating the drawing. In addition, there may be more than one of each of media content source 902 and server 904, but only one of each is shown in FIG. 9 to avoid overcomplicating the drawing. If desired, media content source 902 and server 904 may be integrated as one source device.

In some examples, the processes outlined within system 900 are performed by the MGA of FIG. 1. In some embodiments, server 904 may include control circuitry 911 and a storage 914 (e.g., RAM, ROM, Hard Disk, Removable Disk, etc.). In some embodiments, storage 914 may store instructions that when, executed by control circuitry 911, may cause execution of the MGA, for example, by causing the MGA to execute the steps outlined within system 900. Server 904 may also include an input/output path 912. I/O path 912 may provide device information, or other data, over a local area network (LAN) or wide area network (WAN), and/or other content and data to the control circuitry 911, which includes processing circuitry, and storage 914. The control circuitry 911 may be used to send and receive commands, requests, and other suitable data using I/O path 912, which may comprise I/O circuitry. I/O path 912 may connect control circuitry 911 (and specifically processing circuitry) to one or more communications paths.

Control circuitry 911 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 911 executes instructions for an emulation system application stored in memory (e.g., the storage 914). Memory may be an electronic storage device provided as storage 914 that is part of control circuitry 911.

Server 904 may retrieve guidance data from media content source 902, process the data as will be described in detail below, and forward the data to devices 907 and 910. Media content source 902 may include one or more types of content distribution equipment including a television distribution facility, cable system headend, satellite distribution facility, programming sources (e.g., television broadcasters, such as NBC, ABC, HBO, etc.), intermediate distribution facilities and/or servers, internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 902 may be the originator of content (e.g., a television broadcaster, a Webcast provider, etc.) or may not be the originator of content (e.g., an on-demand content provider, an internet provider of content of broadcast programs for downloading, etc.). Media content source 902 may include cable sources, satellite providers, on-demand providers, internet providers, over-the-top content providers, or other providers of content. Media content source 902 may also include a remote media server used to store different types of content (including video content selected by a user), in a location remote from any of the client devices. Media content source 902 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 904), which may be located centrally or at distributed locations, that provide cloud-based services to various types of users and devices connected via a network such as the internet via communication network 906. In such embodiments, devices may operate in a peer-to-peer manner without communicating with a central server.

Figure 10:
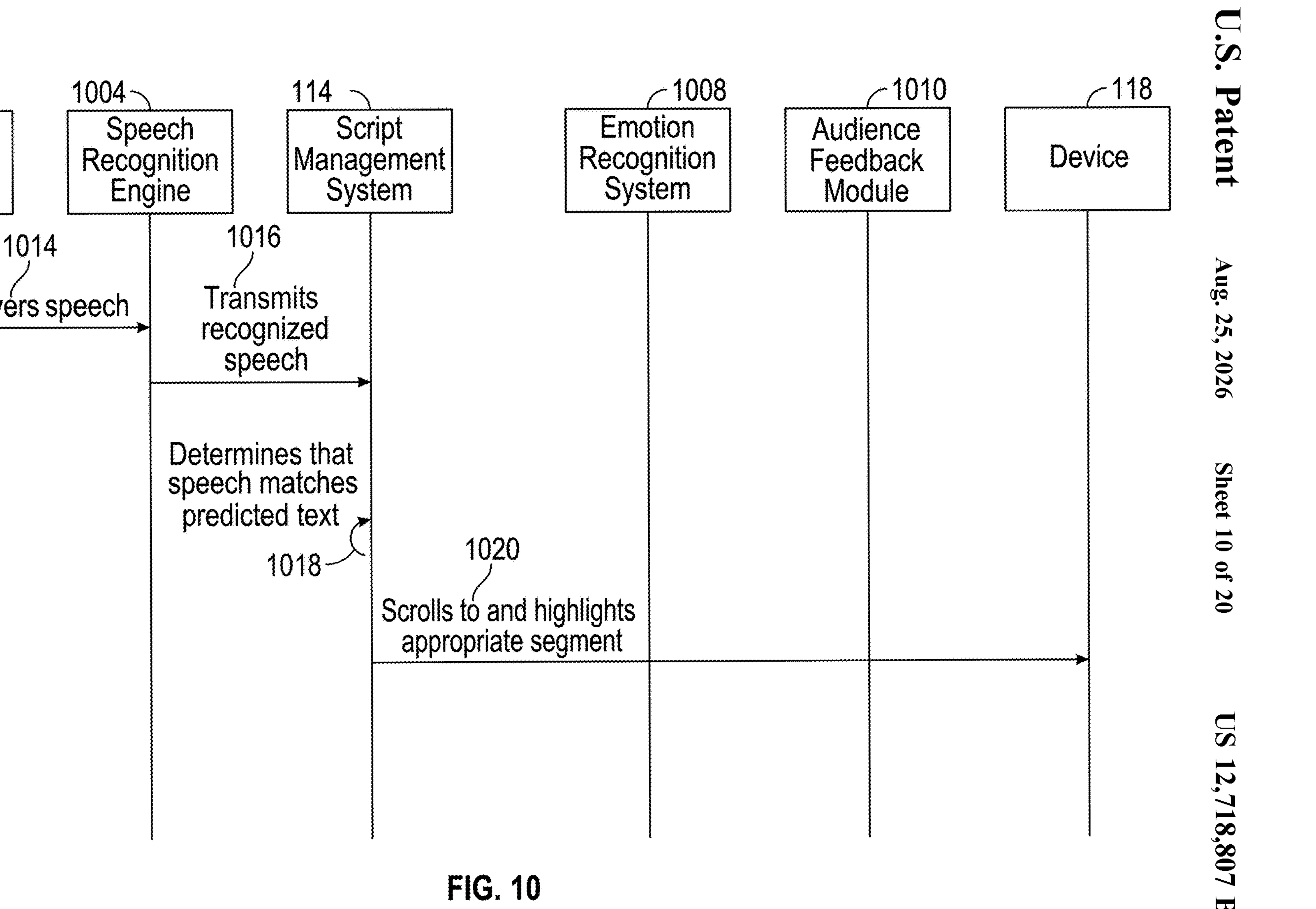
FIG. 10 is a sequence diagram of a system for dynamic content management on an advanced teleprompter based on determining that detected speech from a user matches predicted text in a transcript, in accordance with some embodiments of the present disclosure.

FIG. 10 is a sequence diagram of a system for dynamic content management on an advanced teleprompter based on determining that detected speech from a user matches predicted text in a transcript, in accordance with some embodiments of the present disclosure. In some embodiments, system 1000 includes speaker 122 of FIG. 1, speech recognition engine 1004, SMS 114 of FIG. 1, emotion recognition system 1008, audience feedback module 1010, and device 118 of FIG. 1. In some embodiments, system 1000 includes hardware, for example, microphones, cameras, displays, and computing devices. Microphones capture the audio signals, including the speech signals of speaker 122, as well as speech signals from other users, i.e., audience members. Cameras capture the facial expressions and gestures of speaker 122, as well as the overall audience response. Displays are where device 118 provides visual interfaces to show speaker 122 the most updated version of the transcript, e.g., on-camera displays, monitors stationed in front of speaker 122, augmented reality (AR) glasses that display the transcript in AR, as described further below with reference to FIGS. 17 and 18. Computing devices run the software that processes input information and provides real-time analytics to synchronize and control the various subsystems. In some embodiments, speech recognition engine 1004 is a software framework that operates continuously, translating spoken words into text. In some embodiments, SMS 114 is responsible for the dynamic handling of the transcript, ensuring that the display of device 118 scrolls correctly with the speaker's delivery and adjusting the sections of text shown as directed by other system components. In some embodiments, emotion recognition system 1008 can interpret the vocal tone and facial expressions of speaker 122, suggesting modifications to the script that align with the conveyed emotions if it is not the same in the original transcript, as described further below with reference to FIG. 19. Audience feedback module 1010 will analyze the live audience feedback as the collective response and prompt the SMS 114 to fine-tune the transcript, as described further below with reference to FIG. 20. The actions or descriptions of FIG. 10 may be used with any other embodiment of this disclosure. In addition, the actions and descriptions described in FIG. 10 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. At 1018, SMS 114, using an LLM, e.g., LLM 124 of FIG. 1, determines that the speech matches the predicted text of the transcript, e.g., transcript 116 of FIG. 1, that SMS 114 received, as described further above with reference to FIG. 1. At 1020, SMS 114 scrolls to and highlights the appropriate segment of the transcript on device 118.

FIG. 11 is a sequence diagram of a system for dynamic content management on an advanced teleprompter based on determining that detected speech from a user deviates slightly from predicted text in a transcript but can be semantically matched, in accordance with some embodiments of the present disclosure. In some embodiments, system 1100 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, system 1100 includes additional hardware and software components, as described further above with reference to FIG. 10. The actions or descriptions of FIG. 11 may be used with any other embodiment of this disclosure. In addition, the actions and descriptions described in FIG. 11 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. At 1118, SMS 114, using an LLM, e.g., LLM 124 of FIG. 1, determines that the speech deviates slightly from the transcript, e.g., transcript 116 of FIG. 1, but semantically can be matched, as described further above with reference to FIG. 2. At 1120, SMS 114 finds the location of the semantic match within the transcript, as described further above with reference to FIG. 2. At 1122, SMS 114 scrolls to and highlights the appropriate section of text within the transcript on device 118, as described further above with reference to FIG. 2.

Figure 12:
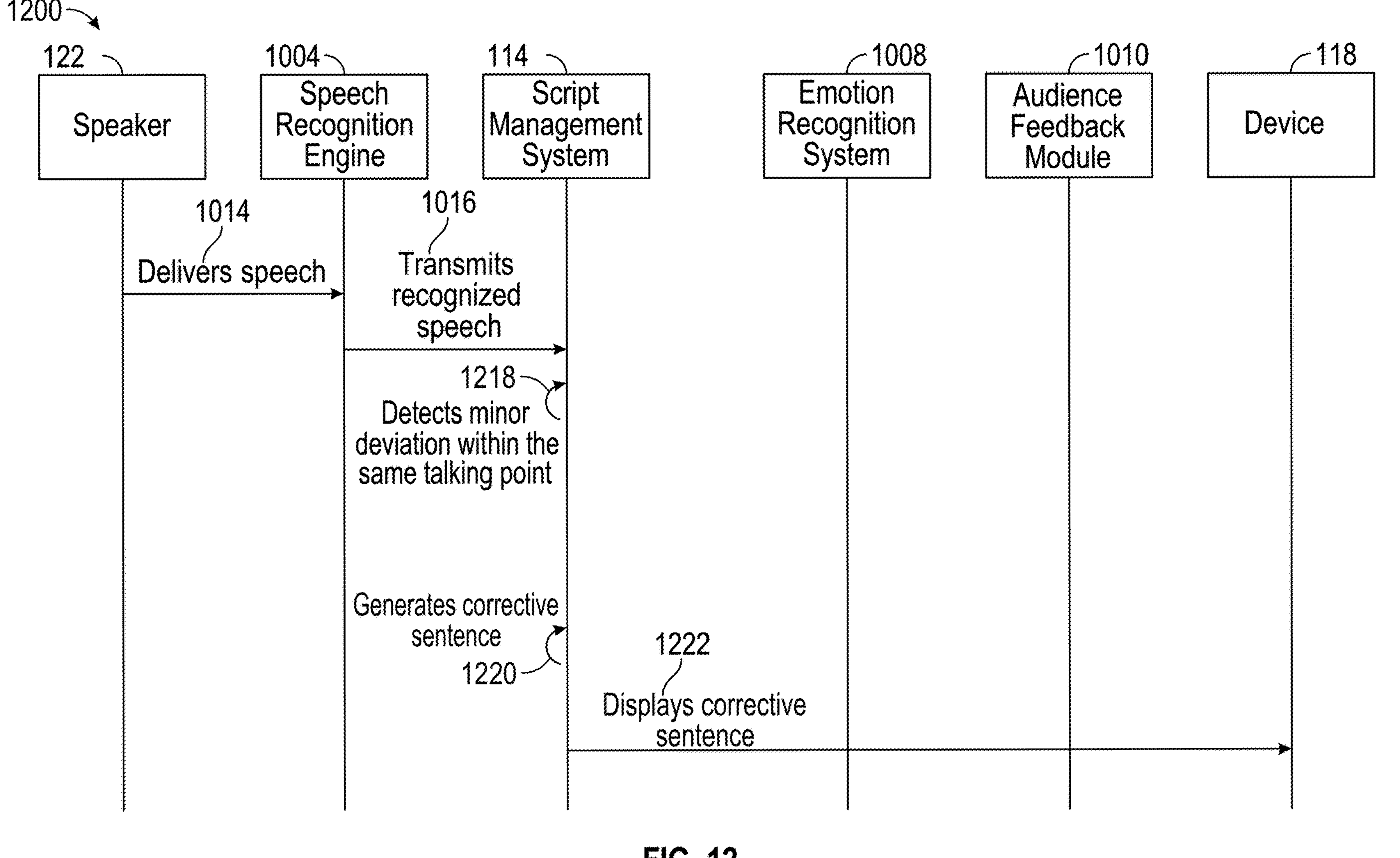
FIG. 12 is a sequence diagram of a system for dynamic content management on an advanced teleprompter based on determining that detected speech from a user deviates from predicted text in a transcript but stays within the same talking point, in accordance with some embodiments of the present disclosure.

FIG. 12 is a sequence diagram of a system for dynamic content management on an advanced teleprompter based on determining that detected speech from a user deviates from predicted text in a transcript but stays within the same talking point, in accordance with some embodiments of the present disclosure. In some embodiments, system 1200 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, system 1200 includes additional hardware and software components, as described further above with reference to FIG. 10. The actions or descriptions of FIG. 12 may be used with any other embodiment of this disclosure. In addition, the actions and descriptions described in FIG. 12 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. At 1218, SMS 114, using an LLM, e.g., LLM 124 of FIG. 1, detects a minor deviation within the same talking point, as described further above with reference to FIG. 3. At 1220, SMS 114, using the LLM, generates a corrective sentence, as described further above with reference to FIG. 3. At 1222, SMS 114 displays the corrective sentence on device 118, as described further above with reference to FIG. 3.

Figure 13:
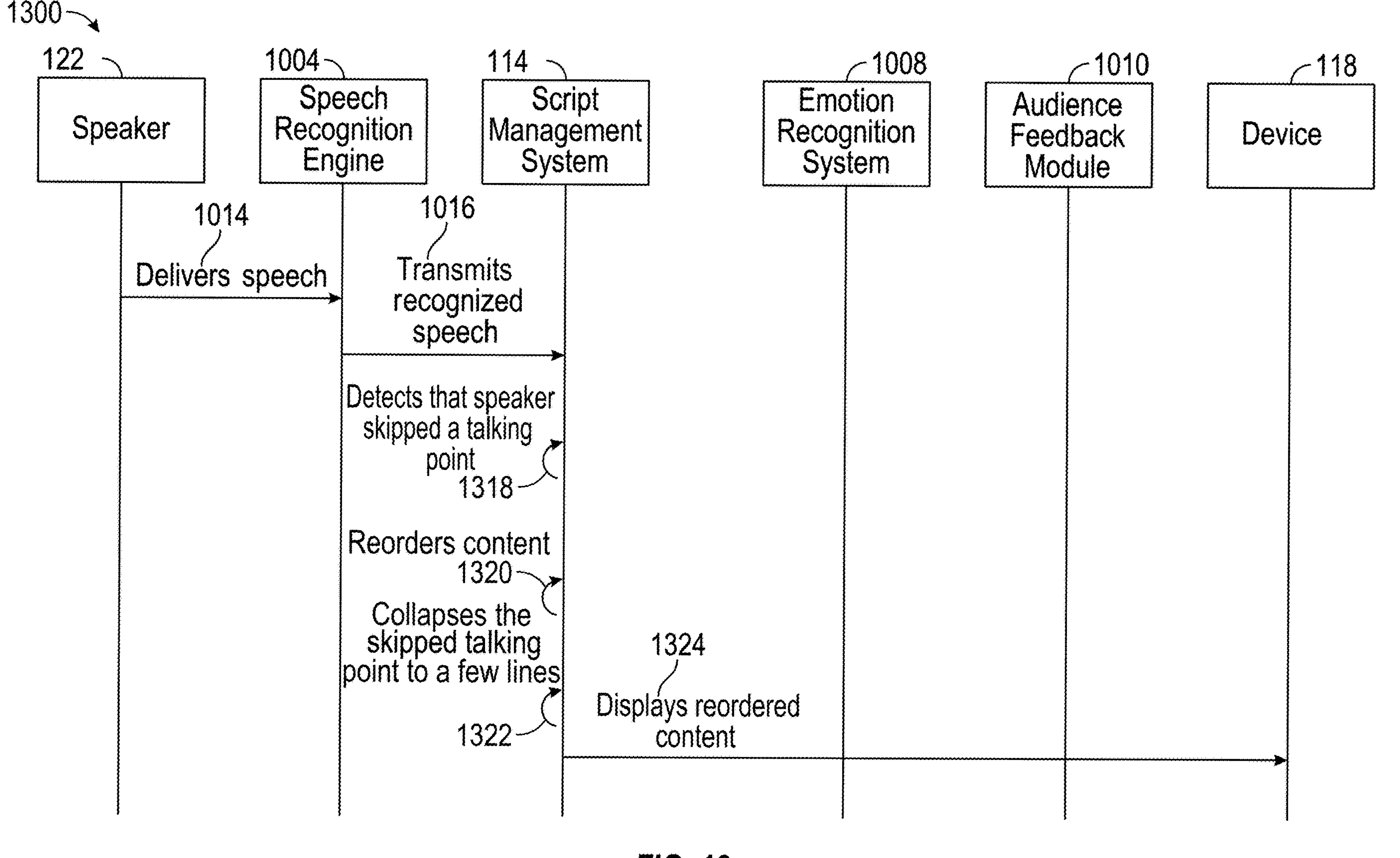
FIG. 13 is a sequence diagram of a system for dynamic content management on an advanced teleprompter based on determining that detected speech from a user skipped a talking point in a transcript, in accordance with some embodiments of the present disclosure.

FIG. 13 is a sequence diagram of a system for dynamic content management on an advanced teleprompter based on determining that detected speech from a user skipped a talking point in a transcript, in accordance with some embodiments of the present disclosure. In some embodiments, process 1300 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, process 1300 includes additional hardware and software components, as described further above with reference to FIG. 10. The actions or descriptions of FIG. 13 may be used with any other embodiment of this disclosure. In addition, the actions and descriptions described in FIG. 13 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. At 1318, SMS 114, using an LLM, e.g., LLM 124 of FIG. 1, detects that speaker 122 has skipped a talking point, as described further above with reference to FIGS. 4 and 5. At 1320, SMS 114, using the LLM, reorders the content on the transcript, e.g., transcript 116 of FIG. 1, as described further above with reference to FIG. 5. At 1322, SMS 114, using the LLM, collapses the skipped talking point to a few lines on the transcript, as described further above with reference to FIGS. 4 and 5. At 1324, SMS 114 displays the reordered transcript content on device 118, as described further above with reference to FIG. 5.

Figure 14:
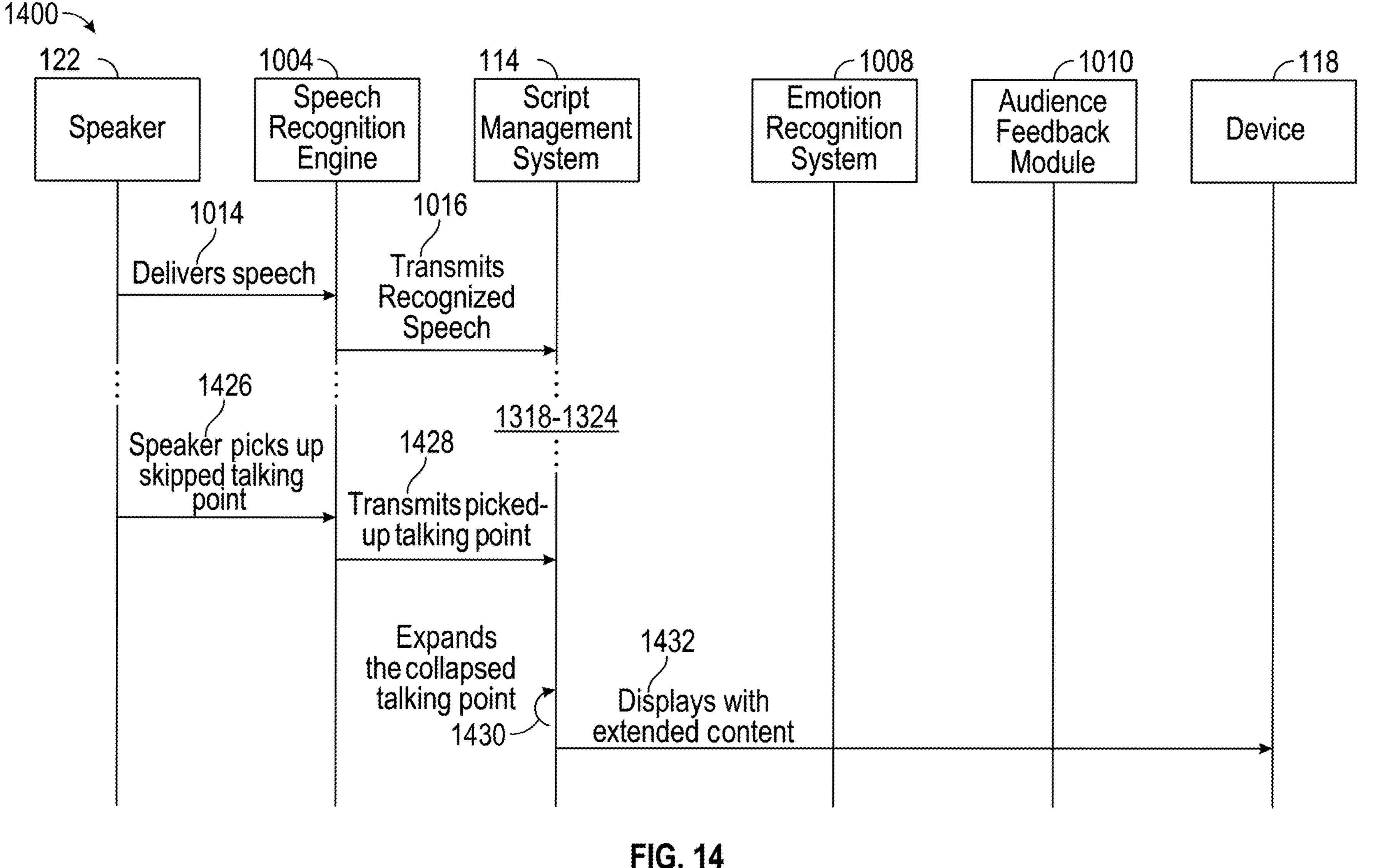
FIG. 14 is a sequence diagram of a system for dynamic content management on an advanced teleprompter based on determining that detected speech from a user skipped a talking point in a transcript but then later picked up the skipped talking point, in accordance with some embodiments of the present disclosure.

FIG. 14 is a sequence diagram of a system for dynamic content management on an advanced teleprompter based on determining that detected speech from a user skipped a talking point in a transcript but then later picked up the skipped talking point, in accordance with some embodiments of the present disclosure. In some embodiments, process 1400 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, process 1400 includes additional hardware and software components, as described further above with reference to FIG. 10. The actions or descriptions of FIG. 14 may be used with any other embodiment of this disclosure. In addition, the actions and descriptions described in FIG. 14 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. In some embodiments, process 1400 then carries out process steps 1318-1324 of process 1300, as described further above with reference to FIG. 13. In some embodiments, following the actions outlined in process step 1324, process 1400 continues at 1426, where the speaker 122 picks up the skipped talking point and delivers the speech with the picked-up talking point to speech recognition engine 1004. At 1428, speech recognition engine 1004 transmits the speech with the picked-up talking point to SMS 114. At 1430, SMS 114 expands the collapsed talking point, as described further above with reference to FIG. 6. At 1432, SMS 114 displays the transcript with the expanded talking point content on device 118, as described further above with reference to FIG. 6.

Figure 15:
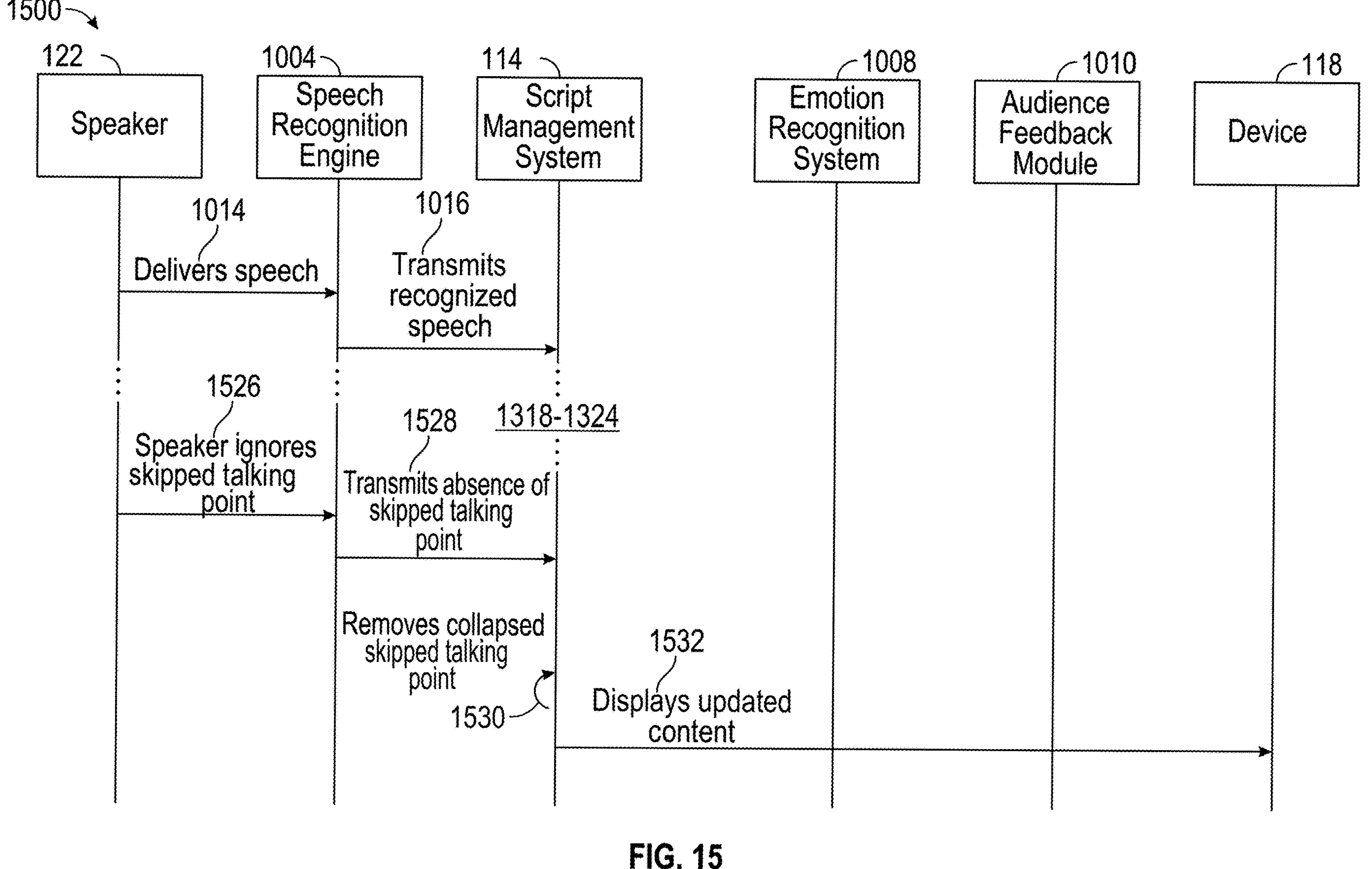
FIG. 15 is a sequence diagram of a system for dynamic content management on an advanced teleprompter based on determining that detected speech from a user skipped a talking point in a transcript and did not pick up the skipped talking point within a certain time period, in accordance with some embodiments of the present disclosure.

FIG. 15 is a sequence diagram of a system for dynamic content management on an advanced teleprompter based on determining that detected speech from a user skipped a talking point in a transcript and did not pick up the skipped talking point within a certain time period, in accordance with some embodiments of the present disclosure. In some embodiments, process 1500 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, process 1500 includes additional hardware and software components, as described further above with reference to FIG. 10. The actions or descriptions of FIG. 15 may be used with any other embodiment of this disclosure. In addition, the actions and descriptions described in FIG. 15 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. In some embodiments, process 1500 then carries out process steps 1318-1324 of process 1300, as described further above with reference to FIG. 13. In some embodiments, following the actions outlined in process step 1324, process 1500 continues at 1526, where speaker 122 ignores the skipped talking point and delivers speech without the skipped talking point to speech recognition engine 1004. At 1528, speech recognition engine 1004 transmits the absence of the skipped talking point to SMS 114. In some embodiments, process steps 1526 and 1528 are continuously repeated until a preset amount of time has elapsed since the talking point was skipped in process step 1318, e.g., three minutes. In some embodiments, once the preset amount of time has elapsed, process 1500 continues at 1530, where SMS 114 removes the collapsed skipped talking point from the transcript. At 1532, SMS 114 displays the updated transcript without the collapsed skipped talking point on device 118.

Figure 16:
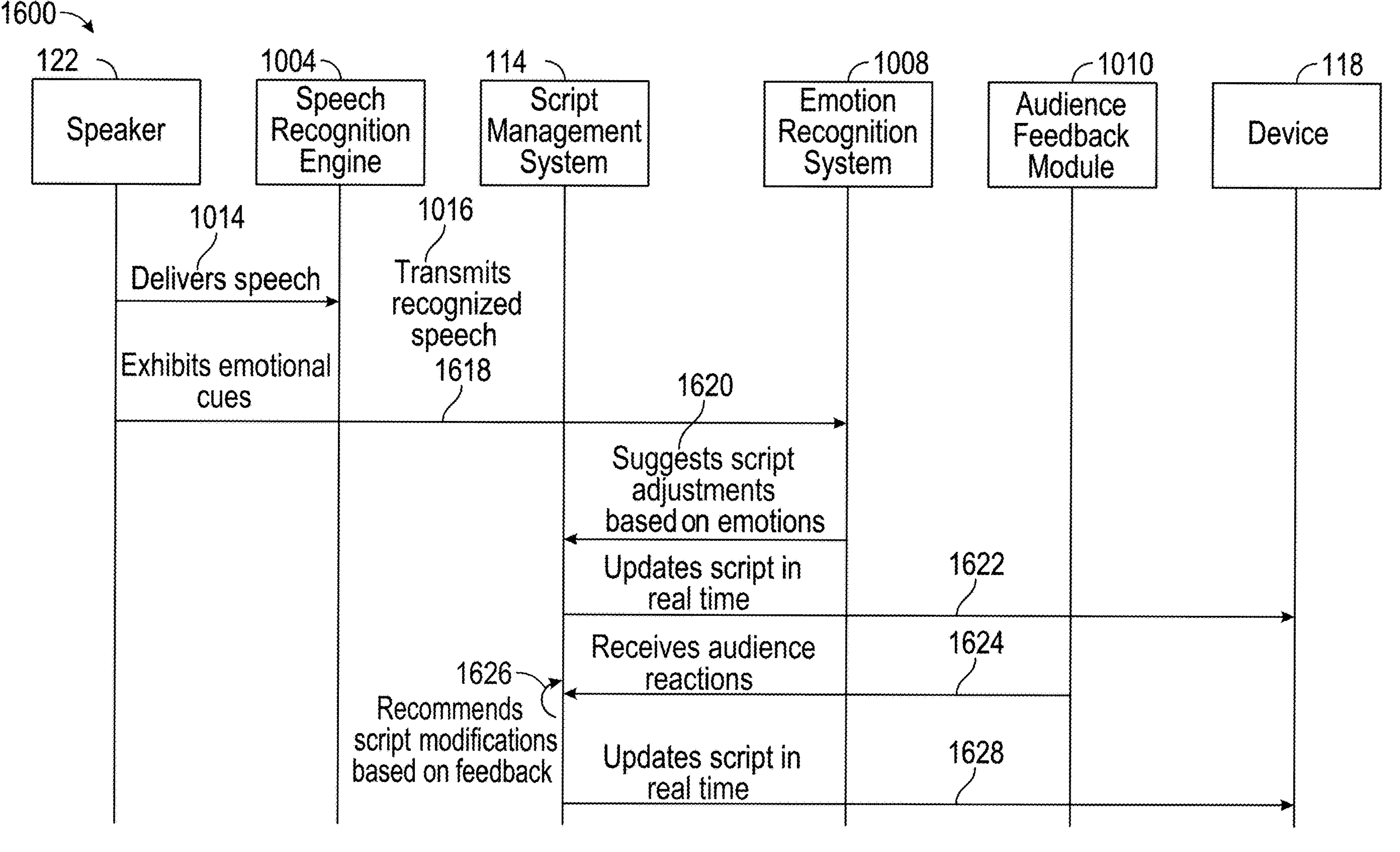
FIG. 16 is a sequence diagram of a system for dynamic content management on an advanced teleprompter based on emotional cues from a speaker and reactions from an audience, in accordance with some embodiments of the present disclosure.

FIG. 16 is a sequence diagram of a system for dynamic content management on an advanced teleprompter based on emotional cues from a speaker and reactions from an audience, in accordance with some embodiments of the present disclosure. In some embodiments, system 1600 includes speaker 122 of FIG. 1, speech recognition engine 1004, SMS 114 of FIG. 1, emotion recognition system 1008, audience feedback module 1010, and device 118 of FIG. 1, all described further above with reference to FIG. 10. In some embodiments, system 1600 includes additional hardware and software components, as described further above with reference to FIG. 10. The actions or descriptions of FIG. 16 may be used with any other embodiment of this disclosure. In addition, the actions and descriptions described in FIG. 16 may be done in suitable alternative orders or in parallel to further the purposes of this disclosure.

At 1014, speaker 122 delivers speech to speech recognition engine 1004, e.g., using microphones. At 1016, speech recognition engine 1004 transmits recognized speech, e.g., speech 120 of FIG. 1, to SMS 114. At 1618, speaker 122 exhibits emotional cues that are detected by hardware, e.g., cameras that capture the facial expressions and gestures of speaker 122, and microphones that pick up the tone and volume of the speech from speaker 122, as described further below with reference to FIG. 19. At 1620, emotion recognition system 1008 suggests script adjustments to SMS 114 based on the emotional cues exhibited by speaker 122, as described further below with reference to FIG. 19. At 1622, SMS 114 updates the transcript, e.g., transcript 116 of FIG. 1, in real time on device 118, as described further below with reference to FIG. 19. At 1624, SMS 114 receives audience reactions from audience feedback module 1010, as described further below with reference to FIG. 20. In some embodiments, the audience reactions are detected by hardware, e.g., microphones that detect speech signals from audience members, and cameras that capture the facial expressions and gestures of audience members. At 1626, SMS 114 recommends transcript modifications based on the audience feedback, as described further below with reference to FIG. 20. In some embodiments, speaker 122 selects an option to accept the recommended modifications based on the audience feedback, e.g., the detected emotional cues from the audience members. At 1628, SMS 114 updates the transcript in real time on device 118, as described further below with reference to FIG. 20.

Figure 17:
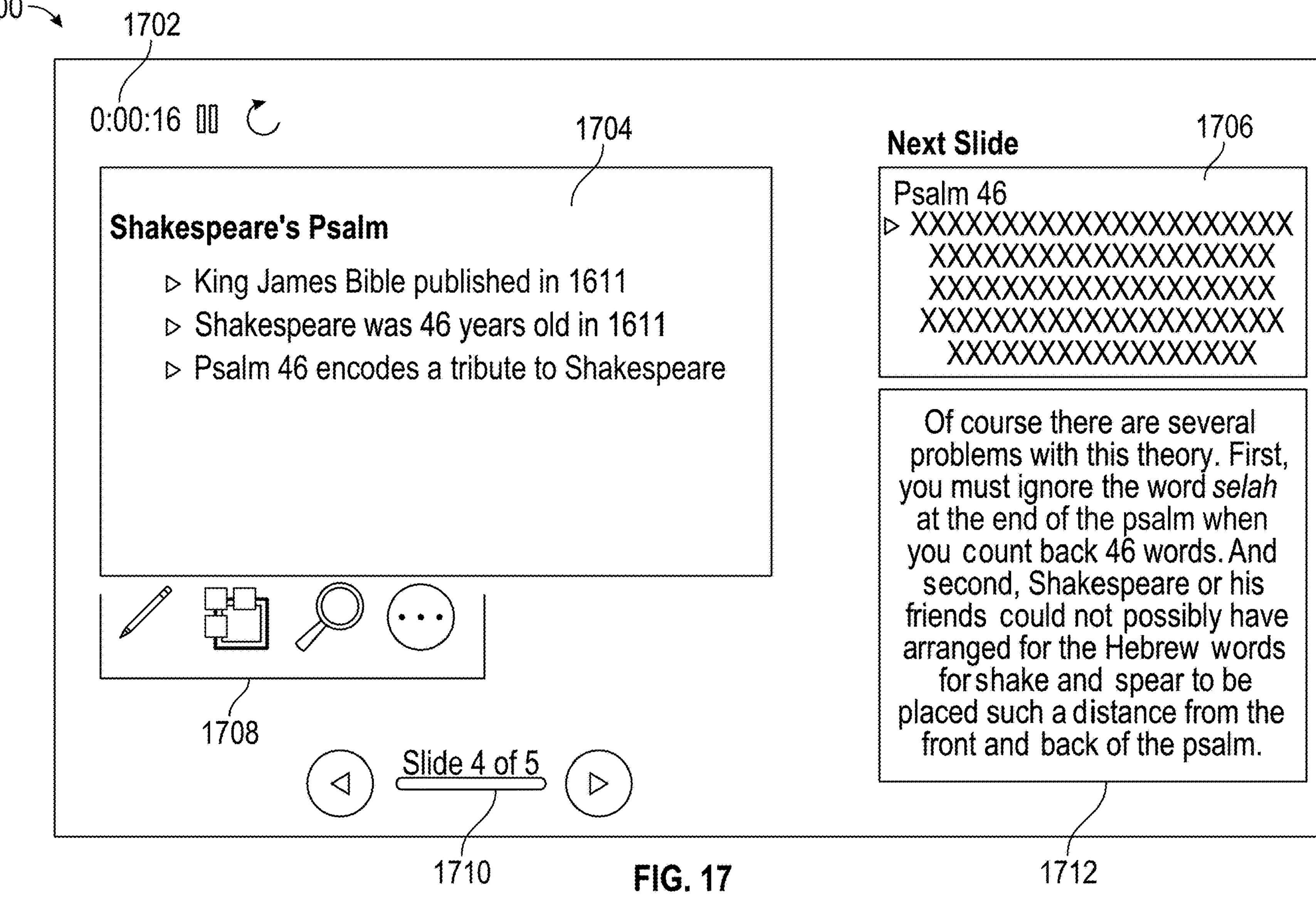
FIG. 17 is an illustrative example of a presentation view on a personal computing device for an advanced teleprompter with dynamic content management, in accordance with some embodiments of the present disclosure.

FIG. 17 is an illustrative example of a presentation view on a personal computing device for an advanced teleprompter with dynamic content management, in accordance with some embodiments of the present disclosure. System 1700 includes timer 1702, current slide view 1704, next slide view 1706, presentation tools 1708, slide navigator 1710, and notes 1712. In some embodiments, timer 1702 shows the elapsed time of the presentation, e.g., 16 seconds. In some embodiments, current slide view 1704 and next slide view 1706 are reproductions of the current slide that the audience is viewing on a separate device, e.g., a projector or display screen only visible to the audience, and the next slide that the audience will be viewing on the separate device, respectively. In some embodiments, presentation tools 1708 include options to edit the presentation, view multiple slides, search through slides, and make other presentation changes. In some embodiments, slide navigator 1710 allows a presenter to navigate easily through the slides and to know the number of the slide they are currently presenting. In some embodiments, notes 1712 are notes for the presentation, and the transcript that the speaker is using to guide their speech, e.g., transcript 116 of FIG. 1, is displayed on a separate device. In some embodiments, notes 1712 show the transcript that the user is using to guide their speech.

Figure 18:
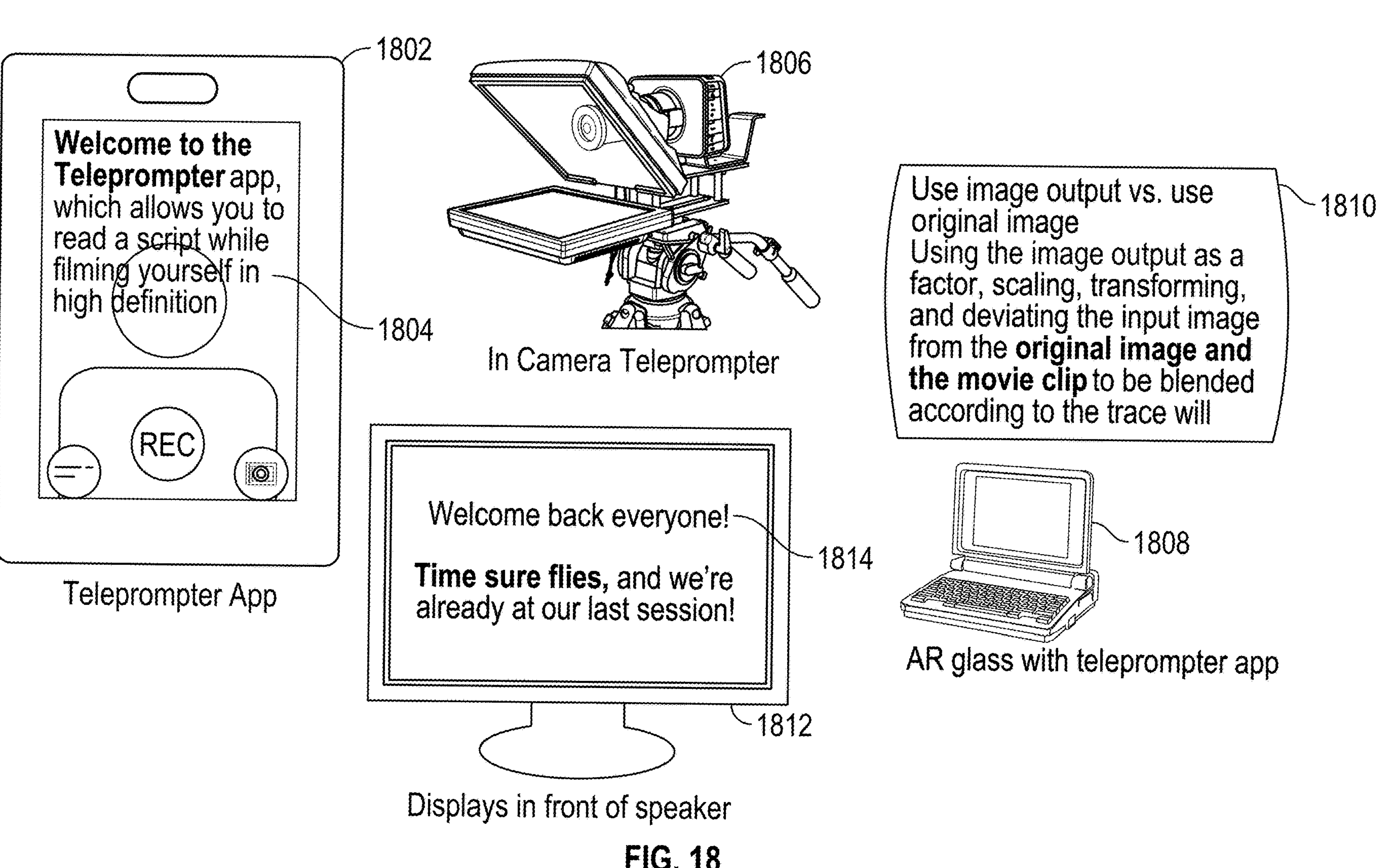
FIG. 18 shows illustrative examples of different display formats for an advanced teleprompter with dynamic content management, in accordance with some embodiments of the present disclosure.

FIG. 18 shows illustrative examples of different display formats for an advanced teleprompter with dynamic content management, in accordance with some embodiments of the present disclosure. System 1800 includes mobile device 1802, camera 1806, personal computing device 1808, AR glass 1810, and display device 1812. In some embodiments, mobile device 1802 is running a teleprompter application 1804 that displays a transcript, e.g., transcript 116 of FIG. 1, to a speaker, e.g., speaker 122 of FIG. 1. In some embodiments, camera 1806 displays the transcript inside a screen built into the camera so the speaker can say the words on the transcript while the camera films and records them. In some embodiments, personal computing device 1808 connects to AR glass 1810 to project the transcript on AR glass 1810. In some embodiments, display devices 1812 display the transcript for the speaker.

Figure 19:
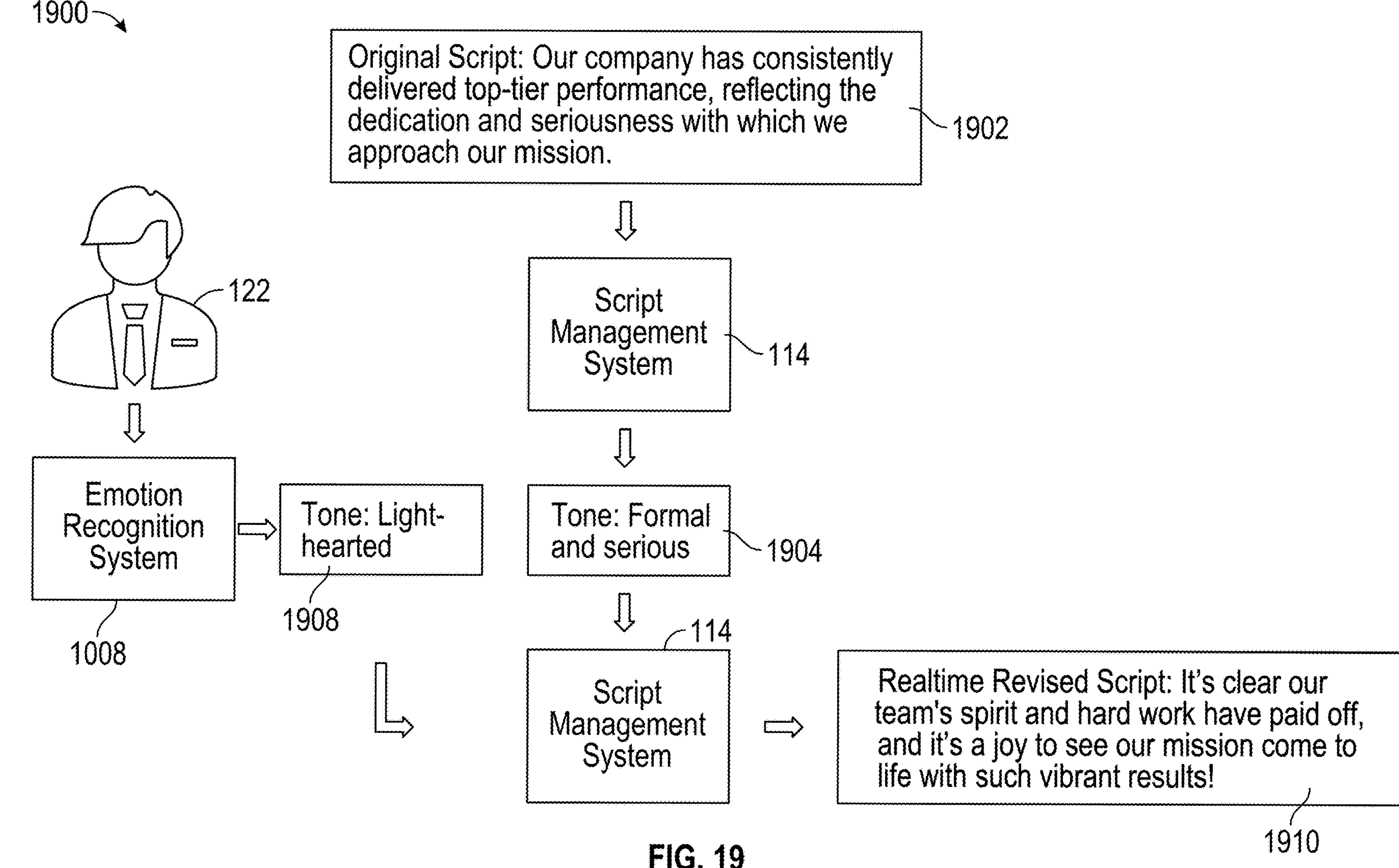
FIG. 19 is an illustrative example of a system for dynamic script changes based on feedback from an emotion recognition system for an advanced teleprompter with dynamic content management, in accordance with some embodiments of the present disclosure.

FIG. 19 is an illustrative example of a system for dynamic script changes based on feedback from an emotion recognition system for an advanced teleprompter with dynamic content management, in accordance with some embodiments of the present disclosure. System 1900 includes speaker 122 of FIG. 1, SMS 114 of FIG. 1, emotion recognition system 1008 of FIG. 16, and original transcript 1902. The actions or descriptions of FIG. 19 may be used with any other embodiment of this disclosure. In addition, the actions and descriptions described in FIG. 19 may be done in suitable alternative orders or in parallel to further the purposes of this disclosure.

At 1908, the emotion recognition system detects a light-hearted tone from speaker 122 and transmits to SMS 114 that the speaker is using a light-hearted tone. In some embodiments, the detection is done using hardware, e.g., microphones and cameras, that capture audio signals and expressions and gestures, respectively, from speaker 122. At 1904, SMS 114 detects a formal and serious tone in original transcript 1902, for example, because the transcript says, "Our company has consistently delivered top-tier performance, reflecting the dedication and seriousness with which we approach our mission." At 1910, SMS 114 generates a revised script in real time that more accurately reflects the light-hearted tone of the speaker, for example, "It's clear our team's spirit and hard work have paid off, and it's a joy to see our mission come to life with such vibrant results!"

Figure 20:
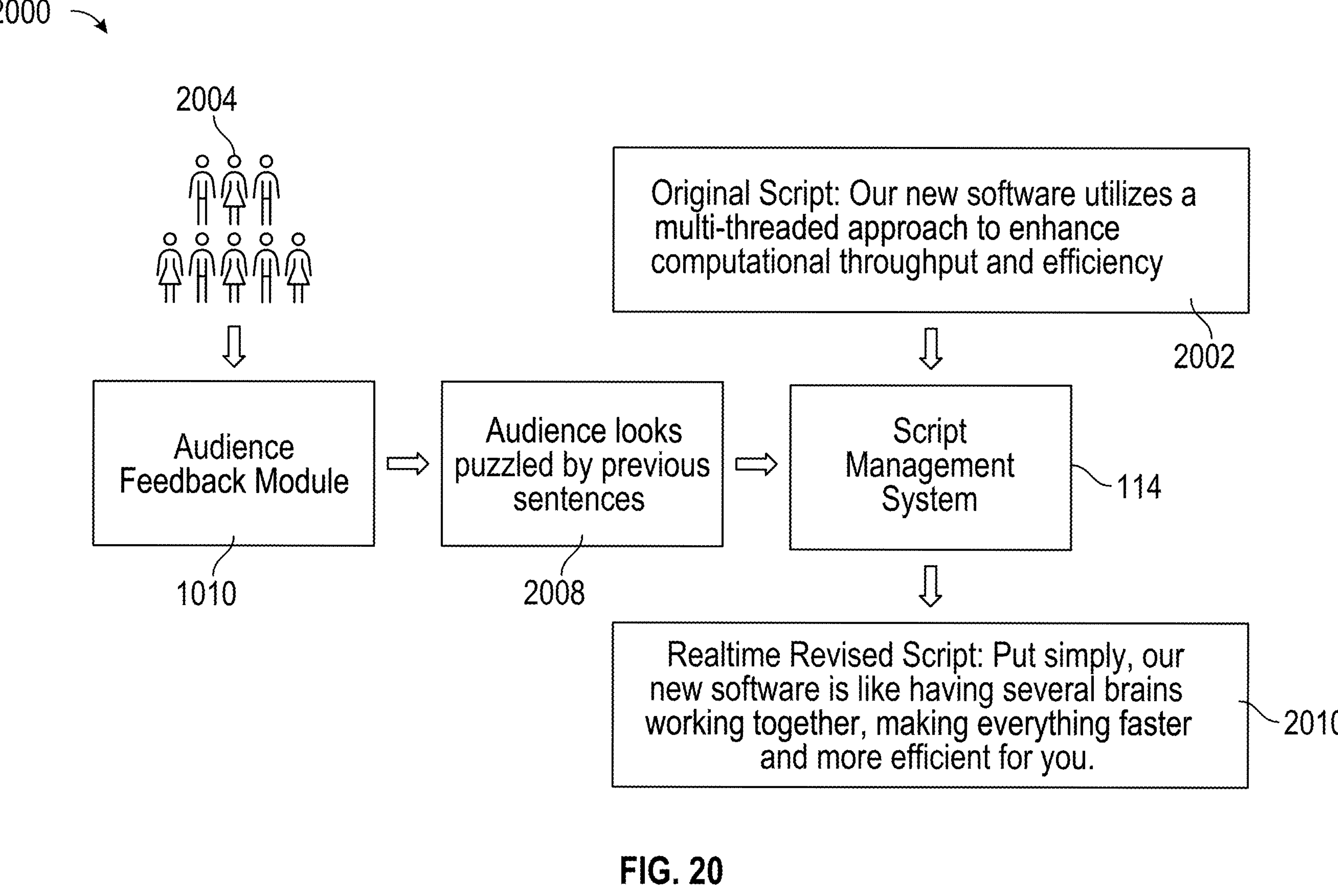
FIG. 20 is an illustrative example of a system for dynamic script changes based on feedback from an audience feedback module for an advanced teleprompter with dynamic content management, in accordance with some embodiments of the present disclosure.

FIG. 20 is an illustrative example of a system for dynamic script changes based on feedback from an audience feedback module for an advanced teleprompter with dynamic content management, in accordance with some embodiments of the present disclosure. System 2000 includes audience members 2004, SMS 114 of FIG. 1, audience feedback module 1010 of FIG. 16, and original transcript 2002. The actions or descriptions of FIG. 20 may be used with any other embodiment of this disclosure. In addition, the actions and descriptions described in FIG. 20 may be done in suitable alternative orders or in parallel to further the purposes of this disclosure.

At 2008, audience feedback module 1010 detects that audience members 2004 look puzzled by the previous sentences of the speech and transmits to SMS 114 that the audience members look puzzled by the previous sentences of the speech. In some embodiments, this detection is done using hardware, e.g., microphones and cameras, that capture audio signals and expressions and gestures, respectively, from audience members 2004. At 2010, SMS 114 revises original transcript 2002, for example, "Our new software utilizes a multi-threaded approach to enhance computational throughput and efficiency," to be "Put simply, our new software is like having several brains working together, making everything faster and more efficient for you," in order to clarify the speech for the audience members.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a transcript comprising a plurality of consecutive sections of text for dynamic display at a device;

providing for dynamic display the plurality of consecutive sections of text at a first pace;

capturing speech from a speaker;

while providing for dynamic display a first section of text of the plurality of consecutive sections of text:

inputting, into a large language model, the transcript and text of the speech from the speaker; and modifying, using the large language model, a section subsequent to the first section of text of the plurality of consecutive sections of text based on outputs of the large language model that results from the inputs of the transcript and the text of the speech; and providing for dynamic display the modified section subsequent to the first section of text of the plurality of consecutive sections of text.

2. The method of claim 1, further comprising:

determining a pace of the speech from the speaker; and adjusting the first pace of the dynamic display of the plurality of consecutive sections of text to match the pace of the speech from the speaker.

3. The method of claim 1, further comprising:

determining, using the large language model, that the speech from the speaker is an exact match to a section of text of the plurality of consecutive sections of text;

providing for dynamic display the section of text that the speech from the speaker is the exact match to, and highlighting the section of text that the speech from the speaker is the exact match to.

4. The method of claim 1, further comprising:

determining, using the large language model, that the speech from the speaker is a semantical match to a section of text of the plurality of consecutive sections of text;

providing for dynamic display the section of text that the speech from the speaker is a semantical match to, and highlighting the section of text that the speech from the speaker is the semantical match to.

5. The method of claim 1, further comprising:

modifying, using the large language model, the first section of text based on determining a difference between the speech and the first section of text by:

generating, using the large language model, a corrective sentence corresponding to the difference between the speech and the first section of text; and generating for presentation the corrective sentence within the first section of text.

6. The method of claim 1, further comprising:

determining, using the large language model, that the speech matches a section of text of the plurality of consecutive sections of text that is not the first section of text;

reordering the plurality of consecutive sections of text based on determining that the speech matches the section of text of the plurality of consecutivesections of text that is not the first section of text;

generating an indicator for display at a client device that the first section of text has been collapsed; and providing for dynamic display the section of text of the plurality of consecutive sections of text that matches the speech.

7. The method of claim 6, further comprising:

determining, using the large language model, that the speech matches the section of text represented as collapsed by the indicator generated for display at the client device;

removing the indicator generated for display at the client device; and generating for dynamic display the section of text that was represented as collapsed by the indicator generated for display at the client device.

8. The method of claim 6, further comprising:

monitoring, using the large language model, the speech for a match to the section of text represented as collapsed by the indicator generated for display at the client device; and removing the indicator generated for display at the client device after a threshold amount of time has passed without detecting a match of the speech and the section of text represented as collapsed by the indicator generated for display at the client device.

9. The method of claim 1, further comprising:

detecting emotional cues from the speaker based on a tone of voice of the speaker, a volume of voice of the speaker, and other sounds and physical gestures from the speaker; and modifying, using the large language model, the first section of text based on the detected emotional cues from the speaker.

10. The method of claim 1, further comprising:

detecting emotional cues from one or more users distinct from the speaker based on tones of voices, volumes of voices, and other sounds and physical gestures from the one or more users distinct from the speaker;

generating for display, using the large language model, recommended modifications to the first section of text based on the detected emotional cues from the one or more users distinct from the speaker;

receiving a selection from the speaker accepting the recommended modifications; and modifying, using the large language model, the first section of text based on the recommended modifications.

11. A system comprising:

control circuitry configured to:

receive a transcript comprising a plurality of consecutive sections of text for dynamic display at a device; and provide for dynamic display the plurality of consecutive sections of text at a first pace;

input/output circuitry configured to:

capture speech from a speaker; and wherein the control circuitry is further configured to:

while providing for dynamic display a first section of text of the plurality of consecutive sections of text:

input, into a large language model, the transcript and text of the speech from the speaker; and modify, using the large language model, a section subsequent to the first section of text of the plurality of consecutive sections of text based on outputs of the large language model that results from the inputs of the transcript and the text of the speech; and provide for dynamic display the modified section subsequent to the first section of text of the plurality of consecutive sections of text.

12. The system of claim 11, wherein the control circuitry is further configured to:

determine a pace of the speech from the speaker; and adjust the first pace of the dynamic display of the plurality of consecutive sections of text to match the pace of the speech from the speaker.

13. The system of claim 11, wherein the control circuitry is further configured to:

determine, using the large language model, that the speech from the speaker is an exact match to a section of text of the plurality of consecutive sections of text;

provide for dynamic display the section of text that the speech from the speaker is the exact match to, and highlight the section of text that the speech from the speaker is the exact match to.

14. The system of claim 11, wherein the control circuitry is further configured to:

determine, using the large language model, that the speech from the speaker is a semantical match to a section of text of the plurality of consecutive sections of text;

provide for dynamic display the section of text that the speech from the speaker is the semantical match to, and highlight the section of text that the speech from the speaker is the semantical match to.

15. The system of claim 11, wherein the control circuitry is further configured to:

modify, using the large language model, the first section of text based on determining a difference between the speech and the first section of text by:

generating, using the large language model, a corrective sentence corresponding to the difference between the speech and the first section of text; and generating for presentation the corrective sentence within the first section of text.

16. The system of claim 11, wherein the control circuitry is further configured to:

determine, using the large language model, that the speech matches a section of text of the plurality of consecutive sections of text that is not the first section of text;

reorder the plurality of consecutive sections of text based on determining that the speech matches the section of text of the plurality of sections of text that is not the first section of text;

generate an indicator for display at a client device that the first section of text has been collapsed; and provide for dynamic display the section of text of the plurality of consecutive sections of text that matches the speech.

17. The system of claim 16, wherein the control circuitry is further configured to:

determine, using the large language model, that the speech matches the section of text represented as collapsed by the indicator generated for display at the client device;

remove the indicator generated for display at the client device; and generate for dynamic display the section of text that was represented as collapsed by the indicator generated for display at the client device.

18. The system of claim 16, wherein the control circuitry is further configured to:

monitor, using the large language model, the speech for a match to the section of text represented as collapsed by the indicator generated for display at the client device; and remove the indicator generated for display at the client device after a threshold amount of time has passed without detecting a match of the speech and the section of text represented as collapsed by the indicator generated for display at the client device.

19. The system of claim 11, wherein the control circuitry is further configured to:

detect emotional cues from the speaker based on a tone of voice of the speaker, a volume of voice of the speaker, and other sounds and physical gestures from the speaker; and modify, using the large language model, the first section of text based on the detected emotional cues from the speaker.

20. The system of claim 11, wherein the control circuitry is further configured to:

detect emotional cues from one or more users distinct from the speaker based on tones of voices, volumes of voices, and other sounds and physical gestures from the one or more users distinct from the speaker;

generate for display, using the large language model, recommended modifications to the first section of text based on the detected emotional cues from the one or more users distinct from the speaker;

receive a selection from the speaker accepting the recommended modifications; and modify, using the large language model, the first section of text based on the recommended modifications.

* * * * *